United States Patent [19]

Itoh et al.

[11] Patent Number: 6,094,252
[45] Date of Patent: *Jul. 25, 2000

[54] GH LCD HAVING PARTICULAR PARAMETERS AND CHARACTERISTICS

[75] Inventors: Yasuhisa Itoh, Tenri; Naofumi Kimura, Nabari, both of Japan

[73] Assignee: Sharp Kabushiki Kaisha, Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/707,768

[22] Filed: Sep. 4, 1996

[30] Foreign Application Priority Data

Sep. 5, 1995 [JP] Japan ................................. 7-228365

[51] Int. Cl.[7] ........................................................ G02F 1/13
[52] U.S. Cl. .......................... 349/180; 349/181; 349/165
[58] Field of Search .................................... 349/165, 180, 349/181, 42, 113

[56] References Cited

U.S. PATENT DOCUMENTS

| | | | |
|---|---|---|---|
| 4,097,131 | 6/1978 | Nishiyama | 349/113 |
| 4,190,329 | 2/1980 | Washizuka et al. | 349/113 |
| 4,556,287 | 12/1985 | Funada et al. | 349/113 |
| 4,579,425 | 4/1986 | Ishii et al. | 349/165 |
| 4,596,446 | 6/1986 | Waters | 349/175 |
| 4,653,865 | 3/1987 | Kando et al. | |
| 4,697,884 | 10/1987 | Amstutz et al. | 349/181 |
| 4,909,605 | 3/1990 | Asano et al. | 349/180 |
| 5,004,324 | 4/1991 | Leehouts et al. | 349/181 |
| 5,124,825 | 6/1992 | Asano et al. | 349/180 |
| 5,191,451 | 3/1993 | Katayama et al. | 349/42 |
| 5,539,550 | 7/1996 | Spitzer et al. | 349/42 |
| 5,576,860 | 11/1996 | Nakamura et al. | 349/165 |
| 5,579,142 | 11/1996 | Sawayama et al. | 349/165 |

FOREIGN PATENT DOCUMENTS

| | | |
|---|---|---|
| 59-028130 | 2/1984 | Japan . |
| 7-239483 | 9/1995 | Japan . |
| 8-036174 | 2/1996 | Japan . |

*Primary Examiner*—William L. Sikes
*Assistant Examiner*—Toan Ton
*Attorney, Agent, or Firm*—Dike, Bronstein, Roberts & Cushman, LLP; David G. Conlin

[57] ABSTRACT

A liquid crystal display device having a liquid crystal cell including: a pair of substrates at least one of which has light transparency; a chiral nematic liquid crystal layer having positive anisotropy of dielectric constant, disposed between the pair of substrates; and a voltage applying circuit for applying a voltage to the liquid crystal layer, wherein the liquid crystal layer contains a pleochroic dye, and liquid crystal molecules in the liquid crystal layer are twisted with respect to a helical axis perpendicular to surfaces of the pair of substrates, a twist angle of the liquid crystal molecules from one of the pair of substrates to the other of the pair of substrates is in a range selected from the group consisting of a range from 0° to 50°, a range from 140° to 250°, and a range of twist angles obtained by adding an integral multiple of n radian to the twist angles in the range from 0° to 50° and in the range from 140° to 250°.

14 Claims, 16 Drawing Sheets

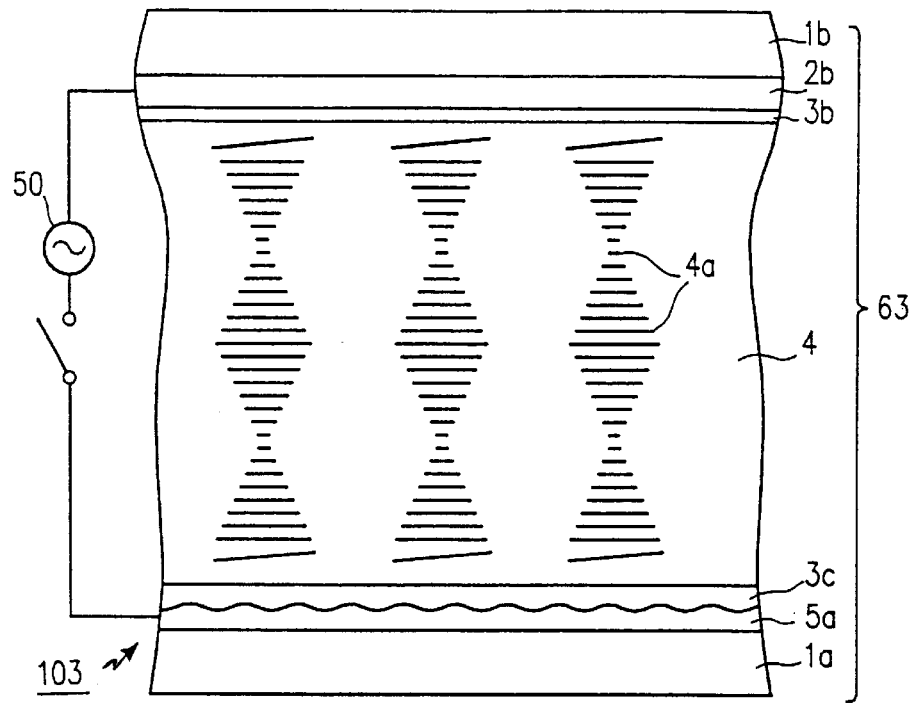
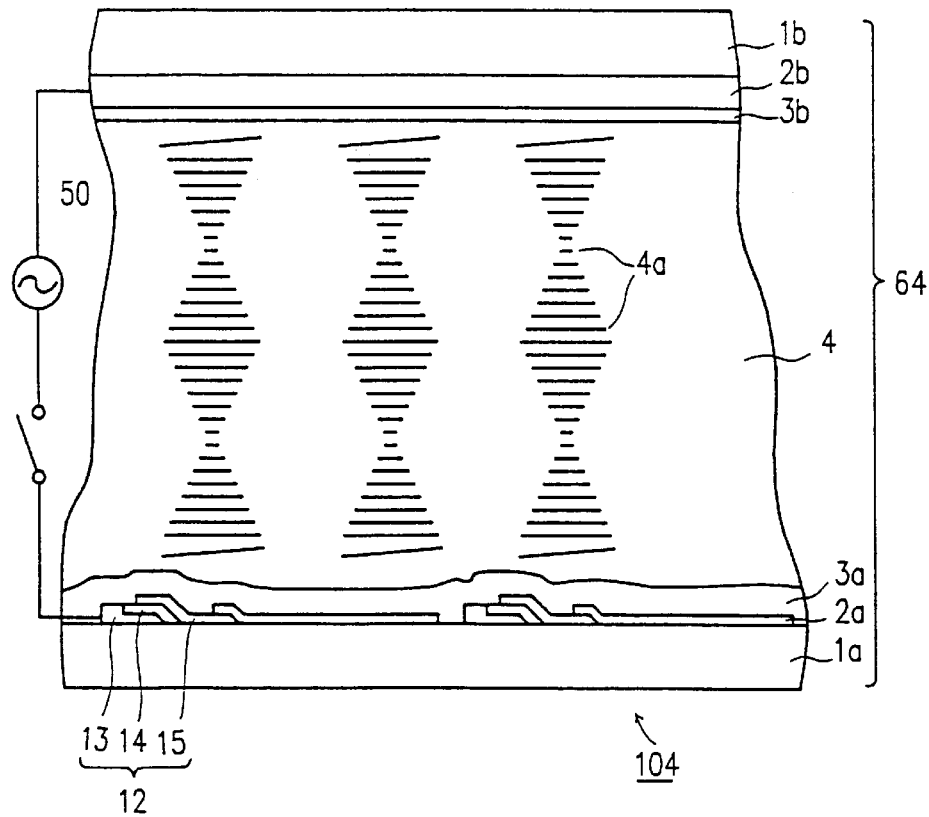

GH LCD HAVING PARTICULAR PARAMETERS AND CHARACTERISTICS

BACKGROUND OF THE INVENTION

1. Field of the Invention

The present invention relates to a liquid crystal display device, and in particular to a liquid crystal display device capable of realizing a bright display.

2. Description of the Related Art

A liquid crystal display device is a non-light-emitting device modulating external light, which is characterized by consuming less electric power and being thin and light-weight. Because of the characteristics, a liquid crystal display device is applicable to a flat panel display and has been widely utilized as an information display device such as a clock, a scientific calculator, a computer terminal, a word processor, and a TV receiver.

As is represented by the buzzword "advanced information age", recently, the collection and selection of information demanded by each person increases along with the increase in the amount of information. Under such circumstances, a portable information terminal for personal use has been recognized and actively developed for its realization.

In the portable information terminal, an information display device as a man-machine interface plays an important role and is placed as a key device. The information display device is required of being capable of displaying a large amount of information, being thin and light-weight, being excellent in visual recognition, and consuming less electric power. A liquid crystal display device has been expected as a device satisfying these characteristics and has been actively developed.

Various methods are used for performing a display using liquid crystal. A representative method uses twisted nematic (TN) liquid crystal. According to this method, a liquid crystal cell including two substrates and liquid crystal inserted therebetween is used, in which the orientation of the liquid crystal molecules from one substrate to the other is twisted by 90°. When being aligned in this manner, liquid crystal molecules exhibit optical rotation which is eliminated by changing the orientation of the liquid crystal molecules with a voltage or the like. This allows the amount of transmitted light to be varied and modulates light intensity, whereby a display is performed.

The TN method uses a low voltage, consumes less electric power, and realizes a gray-scale display with a satisfactory contrast. For these reasons, the TN method is widely used for a liquid crystal display among various operation modes.

The TN method has outstanding characteristics as described above. However, the threshold characteristics of TN liquid crystal are not so steep. Therefore, in order to perform a large capacity display, active elements such as thin film transistors (TFTs) are generally used together with TN liquid crystal. On the other hand, a super twisted nematic (STN) method using liquid crystal which is twisted by more than 90° is proposed. This method uses optical rotation and birefringence of STN liquid crystal which has a steep threshold property. Therefore, this method is suitable for multiplex driving and is capable of performing a large capacity display without using active elements. This method cannot perform a monochromic display since it uses optical rotation and birefringence of liquid crystal. However, an achromatic display is achieved by optical phase compensation. Thus, this method is used for a display device of a word processor and a portable computer.

Furthermore, a method using ferroelectric liquid crystal and birefringence thereof is proposed. This method is characterized by rapid response and a memory property.

There is also a display method using liquid crystal dispersed in a polymer matrix. This method utilizes a scattering effect brought about by the inconsistency in a refractive index between the polymer and the liquid crystal. This method enables a display to be performed without using polarizing plates, so that a bright display with a large viewing angle can be realized.

In addition, there is a guest-host (GH) mode. This mode uses liquid crystal with a pleochroic dye mixed therein. According to this mode, a display is performed by utilizing absorption anisotropy of dye molecules exhibited by the changes in the orientation thereof caused by the changes in the orientation of liquid crystal molecules. Depending upon the orientation state of liquid crystal molecules and the combination of optical elements, various GH display modes are proposed (Mol. Crysta. Liq. Cryst. vol. 63, p. 19, 1981).

A Heilmeier-type GH display mode using uniformly aligned liquid crystal molecules and polarizing plates is capable of performing a gray-scale display with a satisfactory contrast (Appl. Phys. Lett. vol. 13, p. 91, 1968).

There is also a GH display mode realizing a display with a satisfactory contrast without using polarizing plates (SID Symposium Digest p. 96, 1977). According to this mode, a reflective display is realized by combining a quarter-wave plate with a liquid crystal layer in which liquid crystal molecules are uniformly aligned. This mode does not use polarizing plates, so that it enables a gray-scale display with high brightness.

Another GH display mode is proposed (SID Symposium Digest, p. 192, 1980). According to this mode, a display is performed by using two GH liquid crystal cells layered in such a manner that uniformly aligned liquid crystal molecules in each cell are orthogonal to each other. This mode does not use polarizing plates, so that it realizes a gray-scale display with high brightness and a satisfactory contrast.

Furthermore, a phase transition type GH display mode is proposed (J. Appl. Phys. vol. 45, p. 4718, 1974). According to this mode, a liquid crystal layer made of chiral nematic liquid crystal with a dichroic dye mixed therein is inserted between two substrates the surface of which is homeotropically aligned, and a display is performed by using absorption of the dye involved in nematic cholesteric phase transition. This mode does not use polarizing plates, so that it enables a bright display to be performed.

In any of the above-mentioned GH display modes, a viewing angle is large. The GH display mode using a quarter-wave plate, the two-layer type GH display mode, and the phase transition type GH display mode do not use polarizing plates. Therefore, a bright display can be realized.

Still furthermore, a GH display mode, in which liquid crystal molecules are horizontally aligned on the surfaces of substrates and the liquid crystal molecules are twisted from one substrate to the other, is proposed (Japanese Laid-Open Patent Publication No. 59-28130). This mode realizes a large capacity display using simple matrix drive, as well as high brightness.

According to the above publication, in the case where the refractive index anisotropy of liquid crystal molecules is small ($\Delta n \leq 0.15$ in the publication), the light absorption by dye molecules is large. Therefore, it is desired that a device is used without polarizing plates so as to obtain a brighter ON-state. In the case where the refractive index anisotropy of liquid crystal molecules is large ($\Delta n \geq 0.15$ in the publication), it is desired that a single polarizing plate is used so as to increase the light absorption by dye molecules in an OFF-state.

However, the above-mentioned conventional liquid crystal display devices have the following problems.

Regarding the TN and STN methods using polarizing plates, since half of external light is absorbed, light is not efficiently used, making it difficult to obtain a bright display. In the TN method, it is required to provide an active element for each pixel so as to perform a large capacity display. This blocks light, resulting in decrease in utilization efficiency of light. Moreover, a light-blocking layer called a black matrix is provided so as to cover portions other than pixels for the purpose of improving a contrast. This decreases the utilization efficiency of light. In a TN-type large capacity display device using active elements, a traverse electric field between adjacent pixels causes disclination lines to decrease a contrast. In order to solve this problem, disclination lines are covered with a light-blocking layer so as to improve a contrast. However, this, in turn, decreases the utilization efficiency of light.

Because of various reasons as described above, a generally used large capacity display device with TFTs require an external light source such as a backlight so as to obtain a bright display. This enables a satisfactory display to be obtained, while the power consumption by a backlight is larger than that of liquid crystal and the backlight and optical portions thereof are thicker than a liquid crystal display cell. Thus, TN and STN displays cannot realize characteristics such as thinness, light-weight, and low power consumption.

The method utilizing the birefringence of ferroelectric liquid crystal has a problem that a bright display is not obtained because of the use of two polarizing plates and it is difficult to uniformly align ferroelectric liquid crystal molecules.

According to the method utilizing the scattering effect brought about by the inconsistency in a refractive index between a polymer and liquid crystal, polarizing plates are not used, so that a bright display can be obtained. However, it requires a high drive voltage and has an unsatisfactory contrast due to insufficient scattering of light.

According to the method using the combination of uniformly aligned GH liquid crystal and polarizing plates, polarizing plates are used, so that sufficient brightness is not obtained. The reason for using polarizing plates in this mode is to improve a contrast. More specifically, in this mode, polarized light in parallel with an absorption axis of dye molecules is absorbed while polarized light perpendicular to the absorption axis is hardly absorbed. Therefore, light is not sufficiently absorbed with no voltage applied, and hence, a satisfactory contrast is not obtained without polarizing plates.

According to the method for performing a reflective display, using the combination of uniformly aligned GH liquid crystal with a quarter-wave plate, polarizing plates are not used, so that a bright display can be realized. However, the quarter-wave plate satisfies quarter-wave conditions only at a particular wavelength. Therefore, this method is not suitable for a monochromic display.

According to the method for performing a display, using two liquid crystal cells layered in such a manner that the orientation of uniformly aligned liquid crystal molecules in each cell is orthogonal to each other, polarizing plates are not used, so that a gray-scale display with high brightness is obtained. However, it is required to simultaneously drive two liquid crystal cells and it is also difficult to produce a device with such a structure.

In contrast, according to the GH display mode with a structure in which the orientation of liquid crystal molecules is twisted between substrates, the rotation of polarization plane of light does not follow the changes in orientation of liquid crystal molecules. Therefore, light is sufficiently absorbed with no voltage applied, even when polarizing plates are not used. This relatively improves a contrast. In general, as the twist angle becomes larger, the contrast becomes better. However, a voltage required for driving a liquid crystal layer increases with the increase in the twist angle of liquid crystal molecules, and hysteresis is caused in the dependency of light transmittance on an applied voltage. Therefore, a gray-scale display cannot be performed.

A display device using a GH cell is realized when a twist angle of liquid crystal molecules is in the range of n radian to less than $2\pi$ radian, as disclosed in Japanese Laid-Open Patent Publication No. 59-28130. A GH cell in which hysteresis is not caused in the dependency of light transmittance on an applied voltage is achieved by increasing a pretilt angle of liquid crystal molecules. However, in this case, a gray-scale display cannot be performed at a twist angle of more than $2\pi$ radian. Even at a twist angle of $2\pi$ radian or less, there are angles at which the light transmittance decreases under the application of a voltage, and therefore, sufficient brightness cannot be obtained. Furthermore, the above-mentioned publication fails to describe the relationship between the twist angle of liquid crystal molecules and the brightness in an ON-state.

SUMMARY OF THE INVENTION

A liquid crystal display device of the present invention includes a liquid crystal cell having: a pair of substrates at least one of which has light transparency; a chiral nematic liquid crystal layer having positive anisotropy of dielectric constant, disposed between the pair of substrates; and voltage applying means for applying a voltage to the liquid crystal layer, wherein the liquid crystal layer contains a pleochroic dye, and liquid crystal molecules in the liquid crystal layer are twisted with respect to a helical axis perpendicular to surfaces of the pair of substrates, a twist angle of the liquid crystal molecules from one of the pair of substrates to the other of the pair of substrates is in a range selected from the group consisting of a range from about 0° to about 50°, a range from about 140° to about 250°, and a range of twist angles obtained by adding an integral multiple of n radians to the twist angles in the range from about 0° to about 50° and in the range from about 140° to about 250°.

In one embodiment of the present invention, a light reflective plate reflecting light transmitted through the liquid crystal layer is provided outside of the liquid crystal cell.

In another embodiment of the present invention, wherein the voltage applying means includes a transparent electrode provided between the substrate having light transparency and the liquid crystal layer and a reflective electrode provided between the other substrate and the liquid crystal layer.

In another embodiment of the present invention, the liquid crystal cell includes a plurality of display pixels arranged in a matrix, and the voltage applying means has a plurality of active elements for applying a voltage to the liquid crystal layer with respect to each of the display pixels.

In another embodiment of the present invention, a pretilt angle of the liquid crystal molecules in the chiral nematic liquid crystal layer is in the range of about 1° to about 20°.

In another embodiment of the present invention, the twist angle of the liquid crystal molecules in the chiral nematic liquid crystal layer is about 240°.

In another embodiment of the present invention, a ratio d/p is in the range of about 0.41 to about 0.91, where d is a distance between the pair of substrates, and p is a spontaneous pitch of a liquid crystal material contained in the chiral nematic liquid crystal layer.

In another embodiment of the present invention, a birefringence Δn of the liquid crystal material contained in the chiral nematic liquid crystal layer is 0.1 or less.

In another embodiment of the present invention, an elastic constant $k_{11}$ of a splay of a liquid crystal material contained in the chiral nematic liquid crystal layer is about 10 pN or less.

In another embodiment of the present invention, an elastic constant ratio $k_{33}/k_{11}$ between a bend and a splay of the liquid crystal material contained in the chiral nematic liquid crystal layer is about 1.27 or less.

Hereinafter, the function of the present invention will be described.

According to the present invention, a liquid crystal display device with high brightness and a large viewing angle is realized by effectively utilizing absorption anisotropy of a pleochroic dye to improve utilization efficiency of light with low power consumption.

In the GH display mode using a structure in which the orientation of liquid crystal molecules is twisted between substrates, light passes through a liquid crystal layer while rotating its polarization plane. During this time, light is absorbed by pleochroic molecules. This enables light to be sufficiently absorbed with no voltage applied, even when polarizing plates are not used.

The inventors of the present invention conducted a thorough study on the twist angle of liquid crystal molecules and the brightness of a display. As a result, they found that the twist angle as disclosed in the above-mentioned publication (Japanese Laid-Open Patent Publication No. 59-28130) is not always the best, with respect to the brightness in an ON-state, and the brightness in an ON-state greatly depends upon the twist angle. Furthermore, they found that there is an optimum twist angle which allows the brightest display to be performed without any hysteresis.

FIG. 9 shows the dependency of light reflectance on a twist angle of liquid crystal molecules with a voltage applied. As is understood from this figure, the light reflectance changes under the application of a voltage along with the changes in the twist angle. It was found that the light reflectance becomes highest at a twist angle of about 0° and about 180°, and the brightest display can be obtained when a GH liquid crystal display device is produced with a twist angle of liquid crystal molecules at around these values.

Most GH bulk liquid crystal molecules in a liquid crystal layer rise under the application of a voltage, and dye molecules also rise. Therefore, the bulk pleochroic dye hardly contributes to the light absorption and only the pleochroic dye at the interfaces of substrates contributes to the light absorption. That is, when the direction of liquid crystal molecules at the interface of the substrates is parallel to each other, the light absorption becomes smaller with a voltage applied, whereby a bright display can be obtained.

Thus, the invention described herein makes possible the advantage of providing a thin and lightweight liquid crystal display device which has satisfactory utilization efficiency of light with low power consumption.

This and other advantages of the present invention will become apparent to those skilled in the art upon reading and understanding the following detailed description with reference to the accompanying figures.

BRIEF DESCRIPTION OF THE DRAWINGS

FIG. 3 is a cross-sectional view showing a structure of a liquid crystal display device in Example 3 according to the present invention.

FIG. 4 is a cross-sectional view showing a structure of a liquid crystal display device in Example 4 according to the present invention.

DESCRIPTION OF THE PREFERRED EMBODIMENTS

Hereinafter, the present invention will be described by way of illustrative examples with reference to the drawings.

EXAMPLE 1

Figure 1:
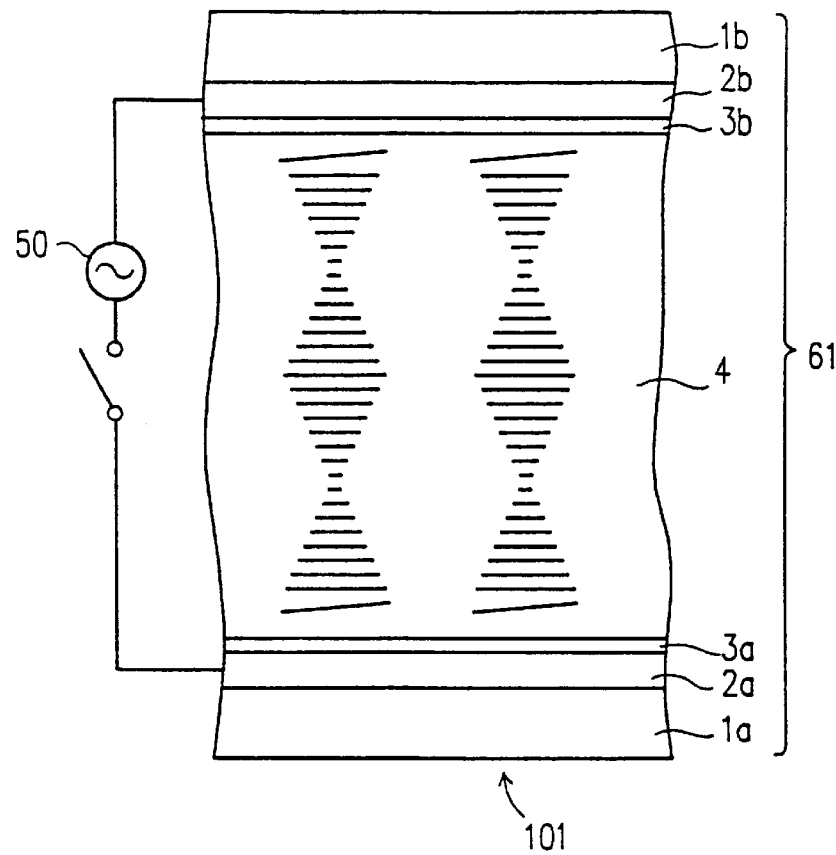
FIG. 1 is a cross-sectional view showing a structure of a liquid crystal display device in Example 1 according to the present invention.

FIG. 1 is a cross-sectional view showing a structure of a liquid crystal display device in Example 1 according to the present invention.

Referring to FIG. 1, a liquid crystal display device 101 has transparent substrates 1a and 1b placed at a predetermined distance. A transparent electrode 2a is provided on the transparent substrate 1a, and an alignment film 3a controlling the orientation of liquid crystal molecules is formed on the transparent electrode 2a. Similarly, a transparent electrode 2b is provided on a transparent substrate 1b, and an alignment film 3b controlling the orientation of liquid crystal molecules is formed on the transparent electrode 2b. A liquid crystal layer 4 including a mixture of a pleochroic dye and a chiral agent is provided between the alignment films 3a and 3b, whereby a GH liquid crystal cell 61 is formed. The liquid crystal layer 4 includes a liquid crystal material with positive anisotropy of dielectric constant. The liquid crystal layer 4 absorbs visible light through the pleochroic dye and has a spontaneous twisted structure due to the chiral agent.

The transparent electrodes 2a and 2b are connected to modulation control means 50 for changing the orientation of liquid crystal molecules., The modulation control means 50 supplies a display voltage across the transparent electrodes 2a and 2b to control the orientation of liquid crystal molecules, whereby the modulation of light intensity is regulated. The GH liquid crystal cell 61 containing helically aligned liquid crystal molecules is combined with the modulation control means 50 to constitute the liquid crystal display device 101 as an optical element capable of modulating the intensity of transmitted light.

Hereinafter, an example of a method for producing the liquid crystal display device 101 with the above-mentioned structure will be described.

A glass substrate (7059, Corning Glass; manufactured by Waaks) having a thickness of 1.1 mm is used as the transparent substrates 1a and 1b. An ITO film is formed on the glass substrates 1a and 1b, respectively, by sputtering to provide the transparent electrodes 2a and 2b. A polyimide film (RN-1024; produced by Nissan Chemical Industries Ltd.) is spin-coated onto the transparent films 2a and 2b so as to be uniform, respectively, whereby the alignment films 3a and 3b are formed. The alignment films 3a and 3b are subjected to rubbing after baking in such a manner that the liquid crystal molecules are twisted by 240° between the substrates 1a and 1b.

Thereafter, glass fiber spacers (produced by Nippon Electric Glass Co., Ltd.) (not shown) with a diameter of 5 µm are sprinkled over the alignment film of one of the transparent substrates so as to uniformly keep the thickness of the liquid crystal layer 4. As a liquid crystal sealing layer (not shown), an adhesive sealant mixed with glass fiber spacers having a diameter of 5.3 µm is printed onto the periphery of each substrate by screen printing. Then, the transparent substrates 1a and 1b are attached to each other so that the alignment films 3a and 3b face each other. Liquid crystal is injected between the substrates 1a and 1b by vacuum injection, whereby the GH liquid crystal cell 61 is produced.

In the present example, the thickness of the liquid crystal layer is set to be 5 µm. However, the thickness is not limited thereto. The thickness of the liquid crystal layer is set in such a manner that the liquid crystal layer absorbs sufficient visible light and a practical response to an applied voltage is obtained. Generally, the thickness is in the range of 1 to 20 µm.

Figure 11:
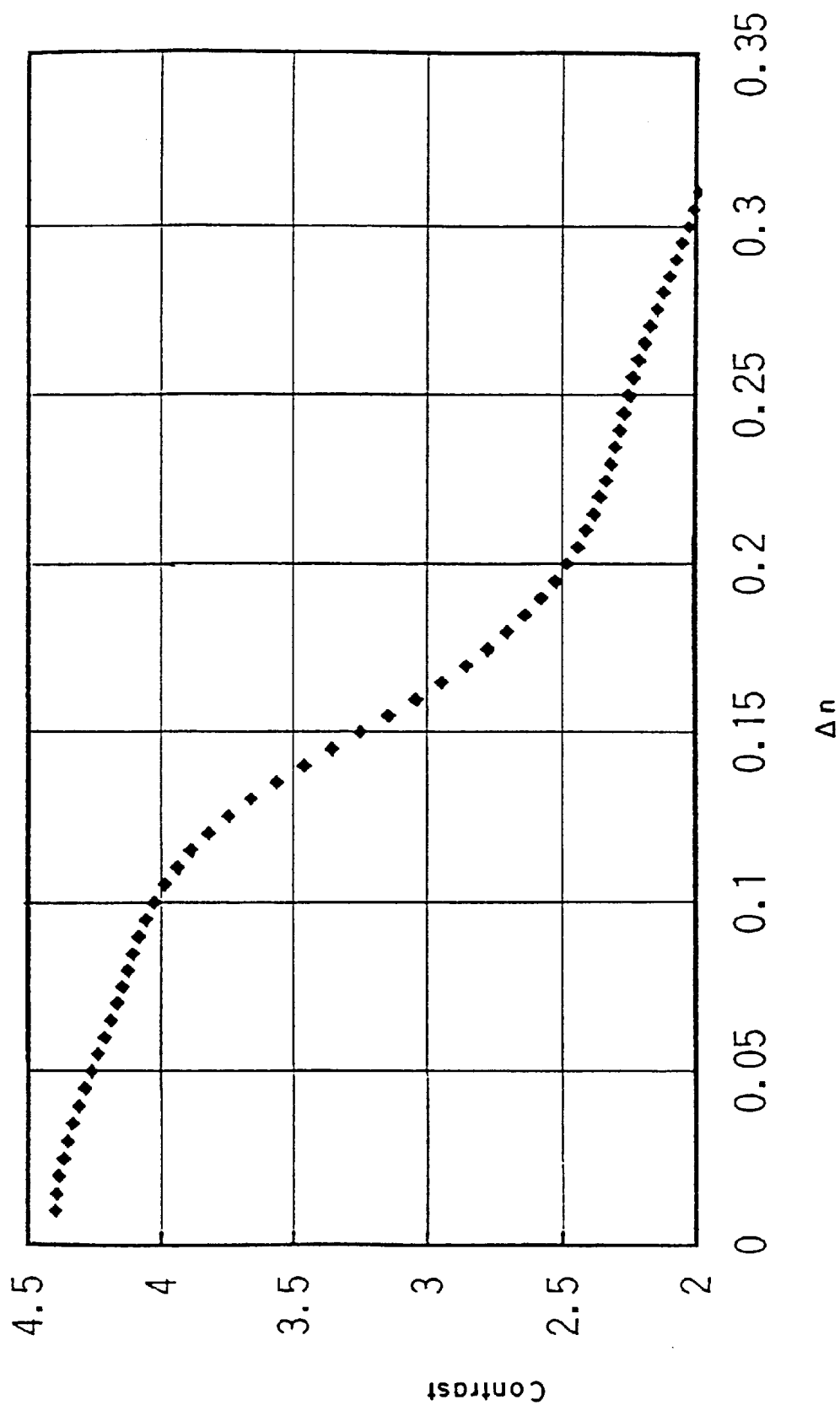
FIG. 11 is a graph showing Δn dependency of a contrast in a GH liquid crystal display device with a twist angle of 240°.

FIG. 11 shows Δn dependency of a contrast of a GH liquid crystal cell in which the orientation of liquid crystal molecules is twisted by 240° (Δn is refractive index anisotropy of liquid crystal). As shown in this figure, the contrast of the GH liquid crystal cell greatly depends upon Δn. In particular, when Δn exceeds 0.1, the contrast rapidly decreases. This is because optical rotation of liquid crystal increases with the increase in Δn, which makes the liquid crystal layer to absorb less light with no voltage applied, leading to the difficulty in obtaining a black display in an OFF-state. Therefore, Δn is preferably 0.1 or less.

In order to uniformly align liquid crystal molecules under the application of a voltage, it is required that the liquid crystal molecules are slightly tilted with respect to the surface of the substrate. It is desired that the angle formed by the orientation direction of the liquid crystal molecules and the surface of the substrate, i.e., a pretilt angle is around 1° to 20°. However, it was confirmed by an experiment that the contrast of the liquid crystal display device becomes satisfactory at a pretilt angle of 5° or more. Therefore, in the present example, the pretilt angle is set to be 5°. The pretilt angle can be controlled by the conditions of rubbing.

A GH liquid crystal material is prepared as follows. Liquid crystal (ZLI-4792; produced by Merck & Co., Inc.) is used as host liquid crystal. Several percent by weight of an azo-type or anthraquinone-type black pleochroic dye is mixed with the host liquid crystal. Furthermore, several percent by weight of an optically active material (S-811; produced by Merck & Co., Inc.) is mixed with the mixture containing the host liquid crystal and the dye for the purpose of allowing the liquid crystal to be spontaneously twisted. A cell thickness d and a spontaneous pitch p are adjusted in such a manner that a ratio d/p becomes almost 0.55. The ratio d/p is not limited to this value. For example, in the present example, the ratio d/p may be in the range of 0.42 to 0.91.

Figure 12:
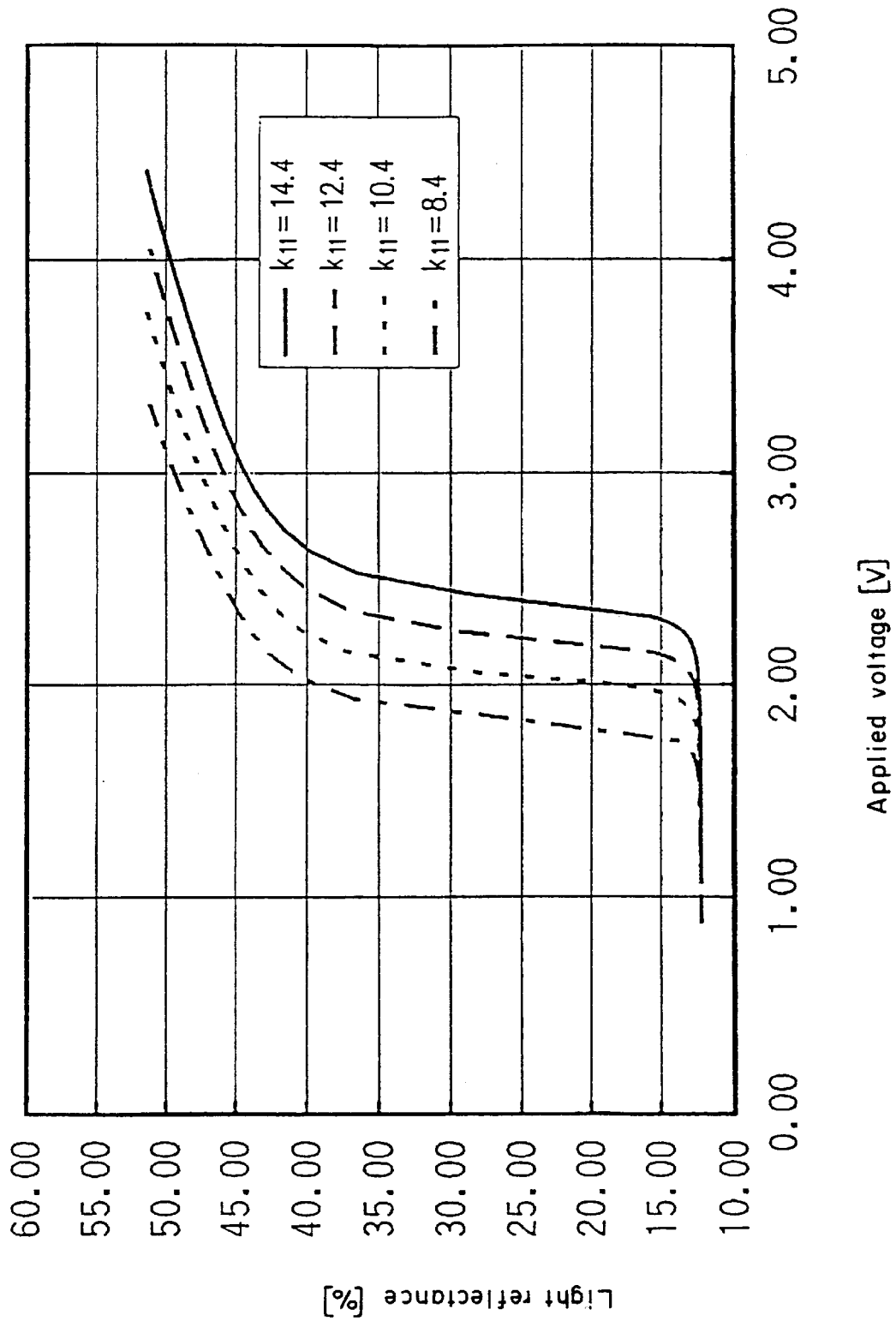
FIG. 12 is a graph showing dependency of light reflectance on an applied voltage under the condition of using an elastic constant $k_{11}$ of a splay as a parameter.
Figure 13:
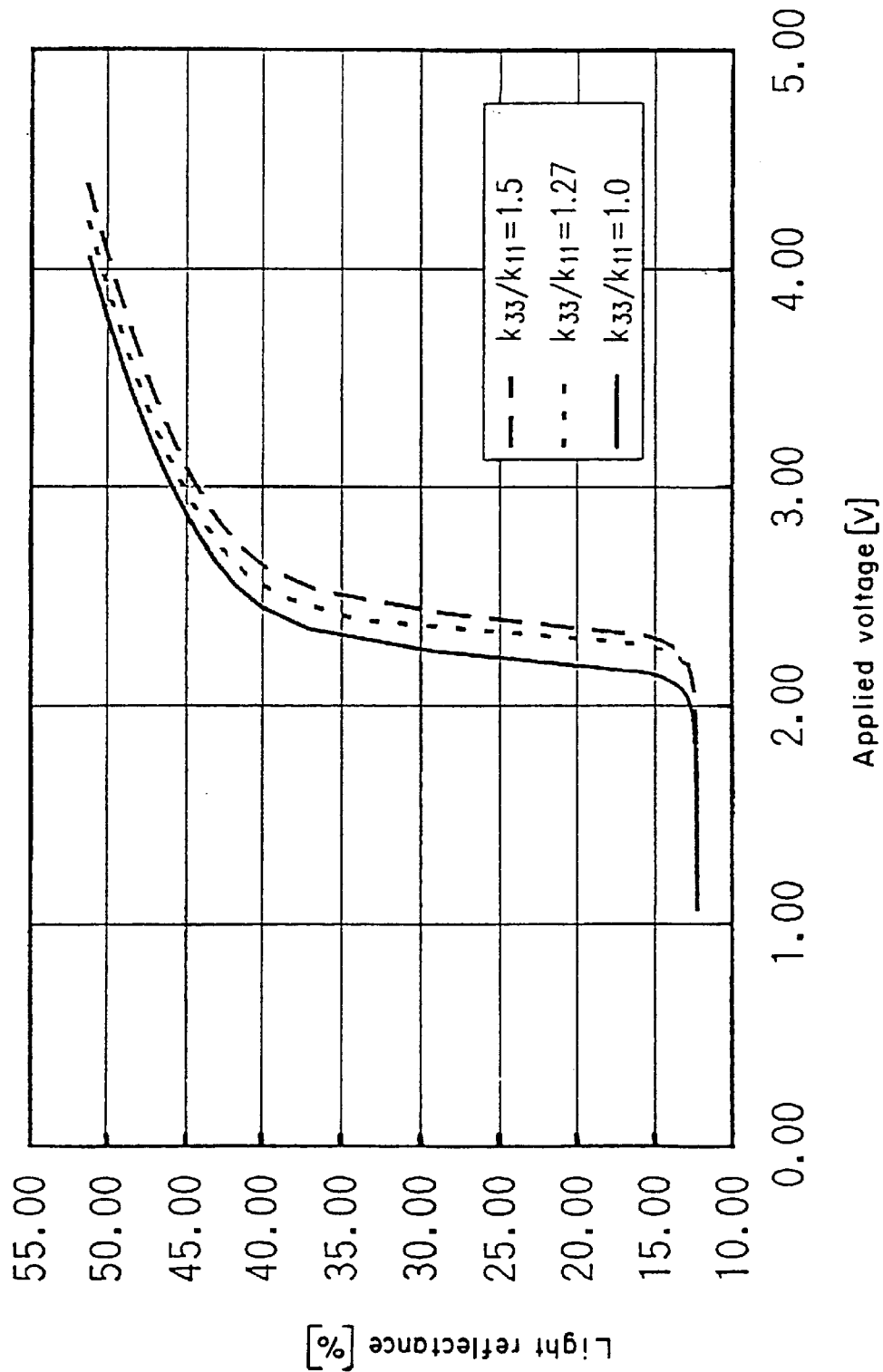
FIG. 13 is a graph showing dependency of light reflectance on an applied voltage under the condition of using an elastic constant ratio $k_{33}/k_{11}$ between a bend and a splay.

The effect of the elastic constant of the liquid crystal of the present example on optical characteristics is evaluated by the calculation based on an Extended Johne's Matrix method. The Extended Johne's matrix method is used only for a polarization optical system. Therefore, the reflectance of natural light is calculated with respect to right circularly polarized light and left circularly polarized light which are two eigen modes of twisted liquid crystal, and the reflectance of each polarized light is averaged, whereby the optical characteristics of GH liquid crystal in the present example are evaluated. As a result, as shown in FIG. 12, the light reflectance gets higher and a brighter display is obtained as the absolute value of an elastic constant $k_{11}$ of a splay becomes smaller with a constant voltage applied in an ON-state. Therefore, in order to obtain a brighter display with a constant applied voltage, the elastic constant $k_{11}$ should be smaller. More specifically, the elastic constant $k_{11}$ is desirably 10 pN or less. Furthermore, as shown in FIG. 13, it is found that the light reflectance gets higher and a brighter display is obtained as the ratio of elastic constants $k_{33}/k_{11}$ between a bend and a splay becomes smaller with a constant voltage applied in an ON-state. Therefore, in order to obtain a brighter display with a constant applied voltage, the ratio $k_{33}/k_{11}$ should be smaller. More specifically, the ratio is desirably 1.27 or less.

Figure 9:
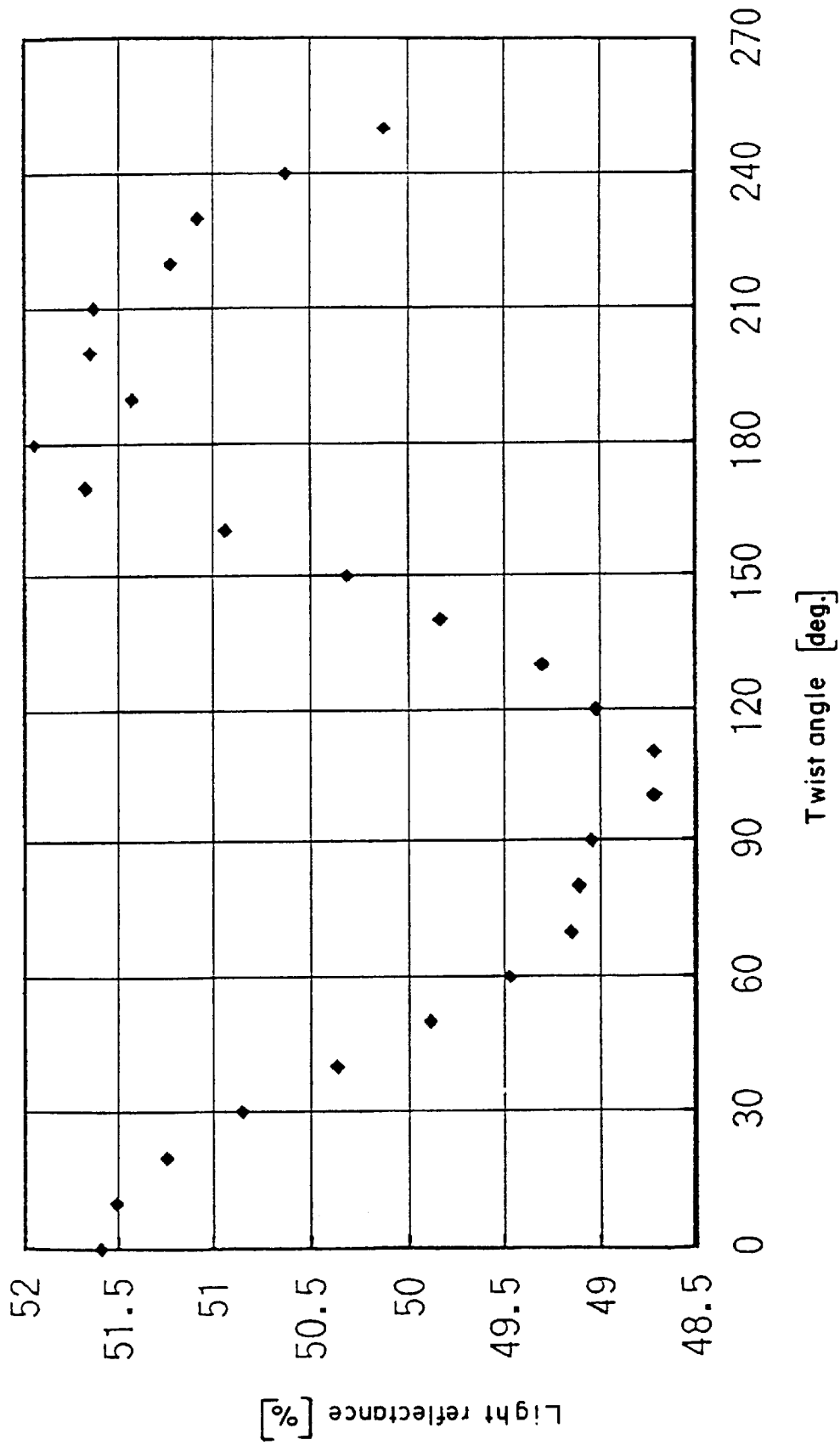
FIG. 9 is a graph showing dependency of light reflectance on a twist angle of liquid crystal molecules in the liquid crystal display device of Example 1 according to the present invention.
Figure 10:
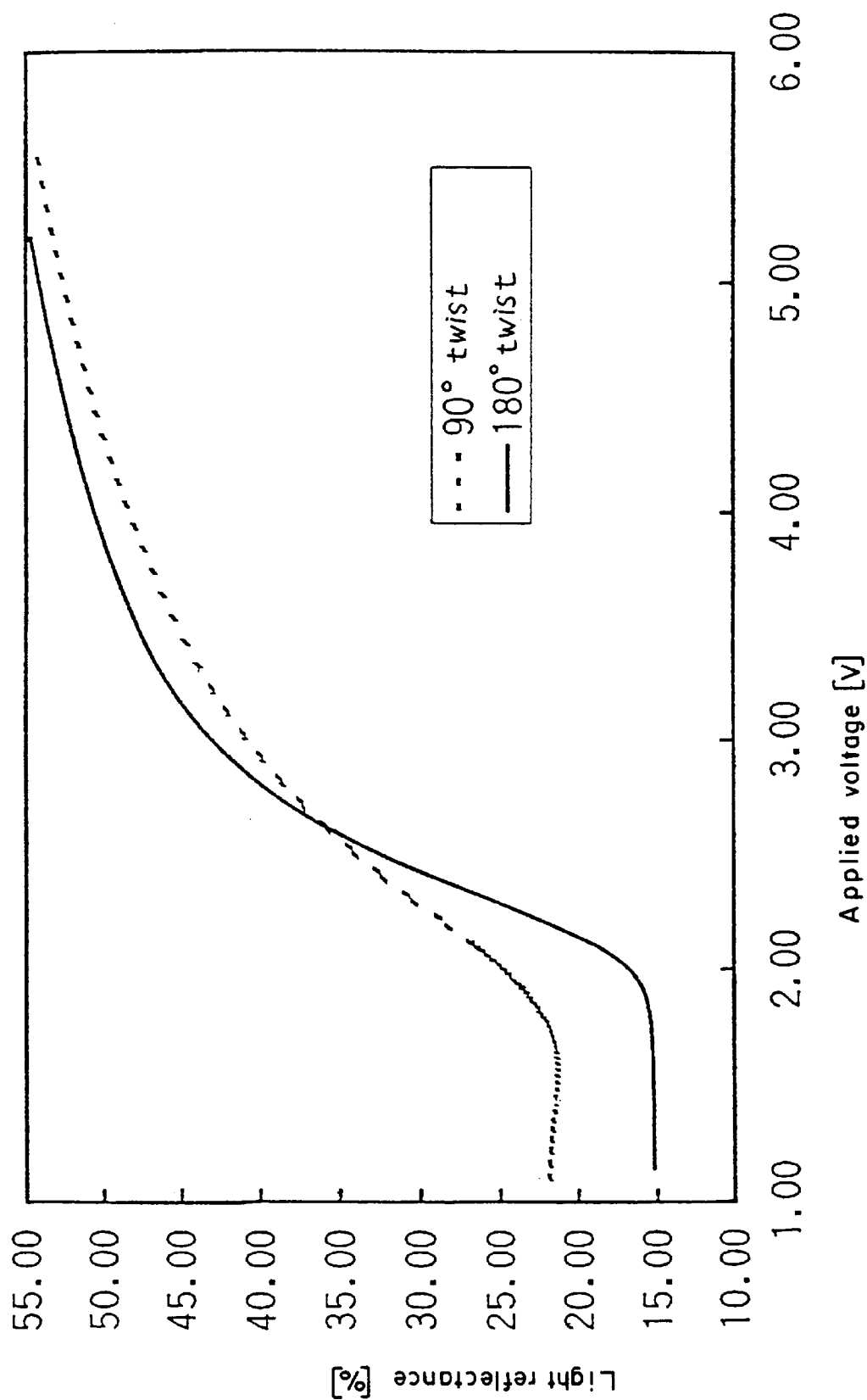
FIG. 10 is a graph showing changes in light reflectance under the application of a voltage along with changes in a twist angle of liquid crystal molecules in a GH liquid crystal display device.

FIG. 10 shows dependency of a light reflectance on an applied voltage when liquid crystal molecules are twisted by 90° and 180° in accordance with the procedure as described above (as shown in FIG. 9, when the liquid crystal molecules are twisted by 180°, the light reflectance is high under the application of a voltage. When the liquid crystal molecules are twisted by 90°, the light reflectance is low under the application of a voltage). It is understood from FIG. 10 that in the liquid crystal display device of the present example, the light reflectance is high and a very bright display can be obtained under the application of a voltage.

In the present example, the twist angle is set to be 240°. Referring to FIG. 9, in practically conducting a display using the liquid crystal display device of the present example, a bright display with a satisfactory contrast is obtained having a light reflectance of about 50% or more (The light reflectance of 50% corresponds to the light reflectance of an ordinary newspaper. Thus, it is understood that in this case, a very satisfactory display is obtained). The twist angle corresponding to the light reflectance of 50% is in the range of 0° to 50° and in the range of 140° and 250°. Thus, the twist angle is preferably in the range of 0° to 50° and in the range of 140° and 250°. Moreover, in principle, the local maximum of the light reflectance appears in a period of $\pi$ radian, so that the twist angles obtained by adding an integral multiple of $\pi$ radian to the twist angles in these ranges are also preferable.

Figure 14:
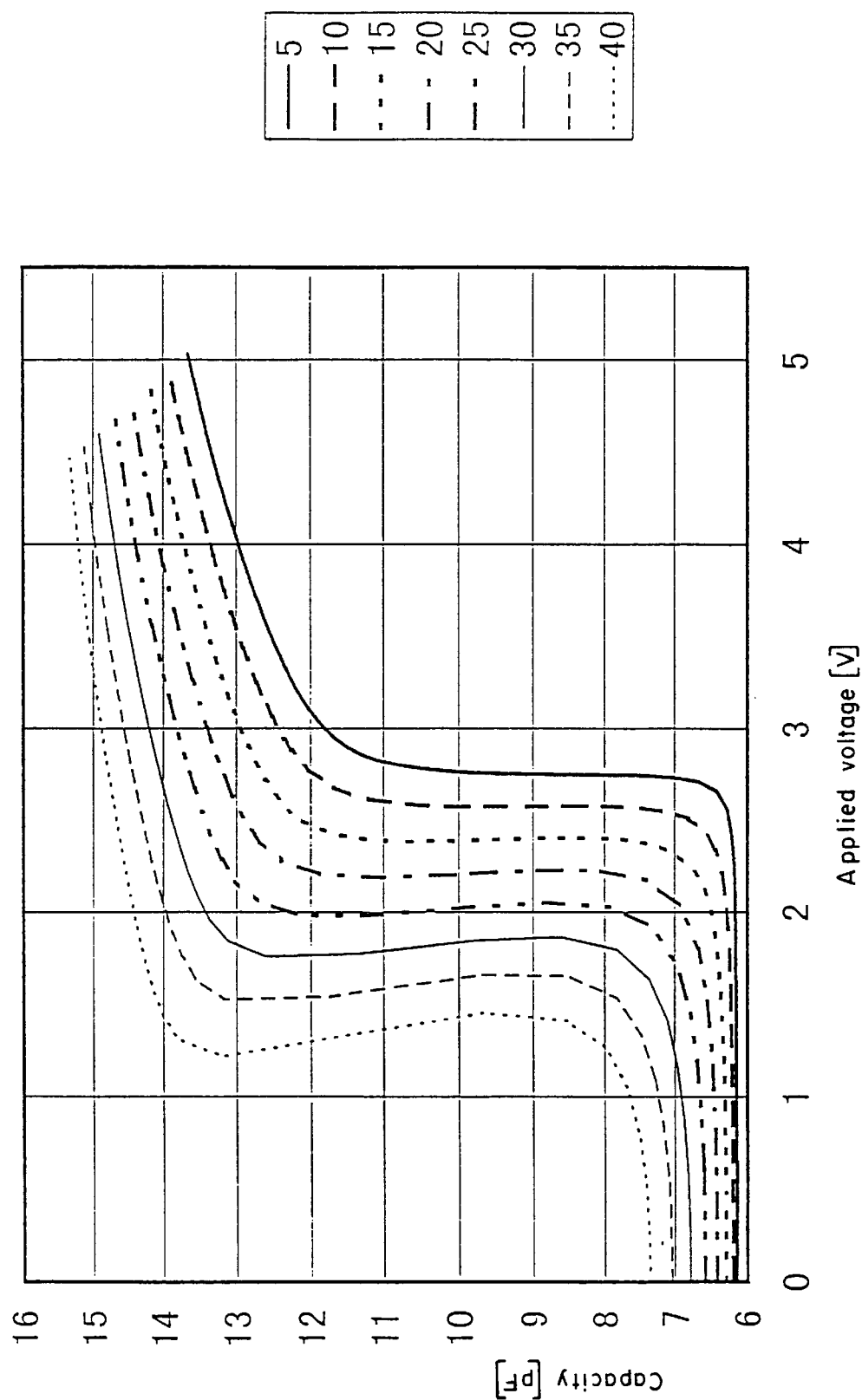
FIG. 14 is a graph showing dependency of a capacitance of a liquid crystal layer on an applied voltage.

In a liquid crystal display device, an angle of rising liquid crystal molecules with respect to the surface of a substrate, i.e., a pretilt angle, is a parameter greatly influencing display characteristics. In the case where a gray-scale display is conducted in the GH liquid crystal display device utilizing a helical structure of liquid crystal layer, hysteresis is caused in dependency of a light reflectance on an applied voltage and domains are formed in a liquid crystal layer, depending upon a twist angle and a pretilt angle. Therefore, a satisfactory display cannot be realized. In order to study which effects a pretilt angle and a twist angle have on hysteresis characteristics, in liquid crystal ZLI-4792 produced by Merck & Co., Inc., dependency of a capacitance on an applied voltage was calculated using a pretilt angle as a parameter, under the condition that a twist angle of liquid crystal molecules between substrates is 240° and a ratio between a spontaneous pitch p and a cell thickness d (d/p) is 0.5. FIG. 14 shows the result. In this calculation, three elastic constants $k_{11}$, $k_{22}$, and $k_{33}$ are set at 13.2 pN, 6.5 pN, and 18.3 pN, and dielectric constants $\epsilon_{\parallel}$ and $\epsilon_{\perp}$, at 8.3 and 3.1, respectively. Herein, dependency of a capacitance on an applied voltage is shown. If hysteresis is caused in this characteristic, hysteresis is also caused in dependency of a light reflectance on an applied voltage. It is understood from FIG. 14 that as a pretilt angle increases, threshold characteristics become steeper allowing liquid crystal molecules to rise at a low voltage, and a capacitance increases. In this example, when the pretilt angle becomes 20°, hysteresis is caused. Thus, a gray-scale display cannot be conducted when using GH liquid crystal cell. As is appreciated from this result, the pretilt angle should be 20° or lower so as to realize a display without any hysteresis. As is understood from the above result, a smaller tilt angle is suitable for a gray-scale display. However, when the tilt angle is too small, an orientation defect called a stripe domain is caused under the application of a voltage in the vicinity of a threshold, preventing a satisfactory display from being conducted. In order to eliminate stripe domains, it is effective to decrease the ratio d/p, to use liquid crystal having large anisotropy of dielectric constant, or to decrease the twist angle of liquid crystal molecules between the substrates. It is effective to decrease the ratio d/p at the same twist angle. However, when the d/p is too small, the orientation of liquid crystal molecules becomes stable at a twist angle smaller by 180°. For example, in the case where alignment films on the substrates provide pretilt directions which are shifted from each other by 240°, when the ratio d/p is below 0.42, the orientation becomes stable at a twist angle of 60°. In this case, when the d/p exceeds 0.91, the orientation becomes stable at a twist angle of 420°. Therefore, a twist angle of 240° can be realized when the ratio d/p is in the range of 0.42 to 0.91. However, even when the ratio d/p is in this range, in the case where the ratio d/p is too large, the orientation defect called a stripe domain as described above is caused. Thus, the upper limit of the ratio d/p is determined based on an experiment. In the case where the pitch p is constant, the margin of the cell thickness d becomes large, so that the allowable range of the ratio d/p is preferably large.

In the case of the above-mentioned ZLI-4792, a pretilt angle is required to be 5° or more in order to obtain a practical range of the ratio d/p. When the pretilt angle is too small, a reverse tilt is caused under the application of a voltage to form disclination lines, decreasing the uniformity of a display. Therefore, the pretilt angle is desirably 1° or more. In summary, a smaller pretilt angle is preferable for a display without any hysteresis. However, when the pretilt angle is too small, stripe domains are formed to decrease the allowable d/p range. Therefore, too small pretilt angle is not suitable for the production of an actual liquid crystal display device. Thus, the pretilt angle is preferably in the range of about 1° to about 20°, and more preferably 5° or more.

SiO oblique evaporation is used for obtaining a large tilt angle. However, this method is not suitable for a large area and makes a production process complicated, so that it is not suitable for actual production. In the case where a large pretilt angle is formed by rubbing a polyimide film, it is very difficult to obtain a uniform pretilt angle over a large area, because the pretilt angle is very sensitive to rubbing conditions. The pretilt angle in the range of about 5° to 10° is stably realized by the current process, so that the pretilt angle in this range of about 1° to 20° is preferable in terms of easiness of production.

Figure 15A:
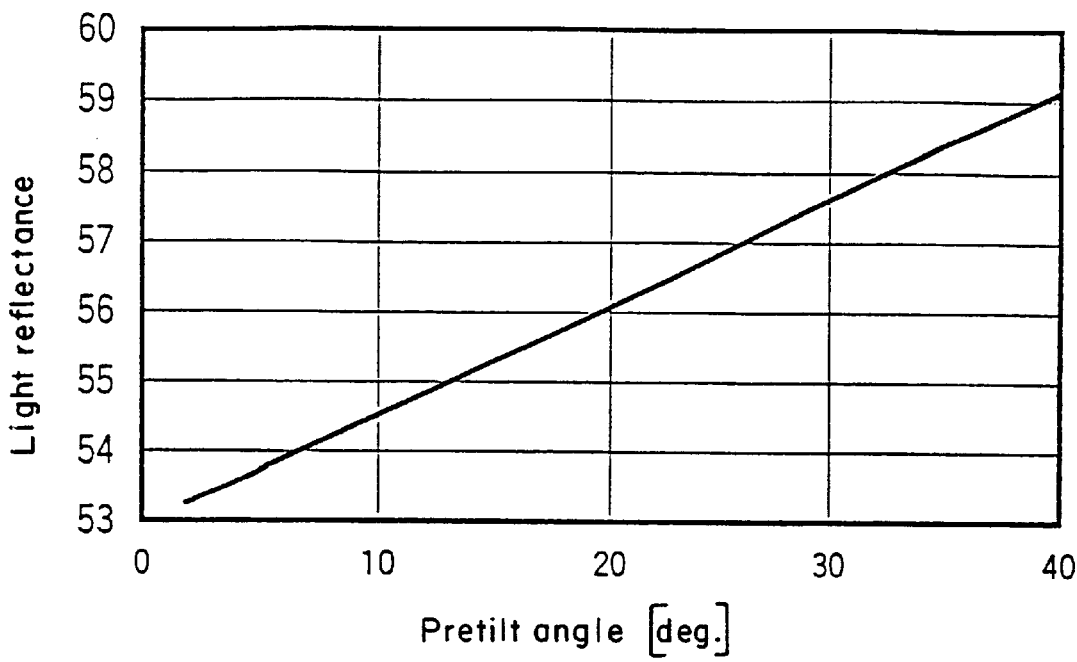
FIGS. 15A and 15B show graphs respectively showing dependency of light reflectance on a pretilt angle.
Figure 15B:
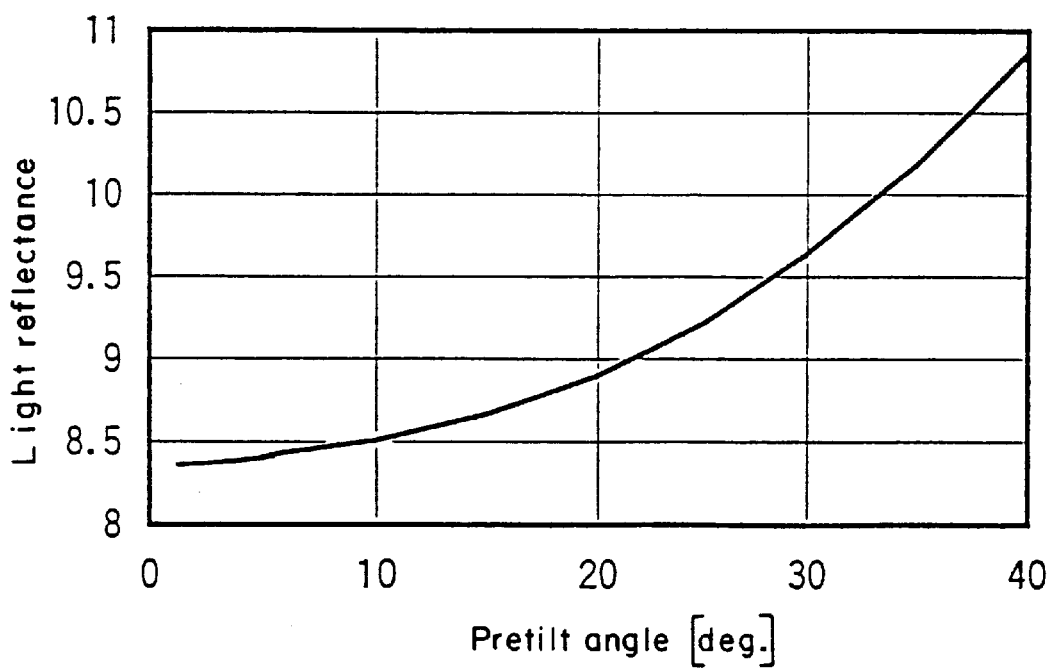
Figure 16A:
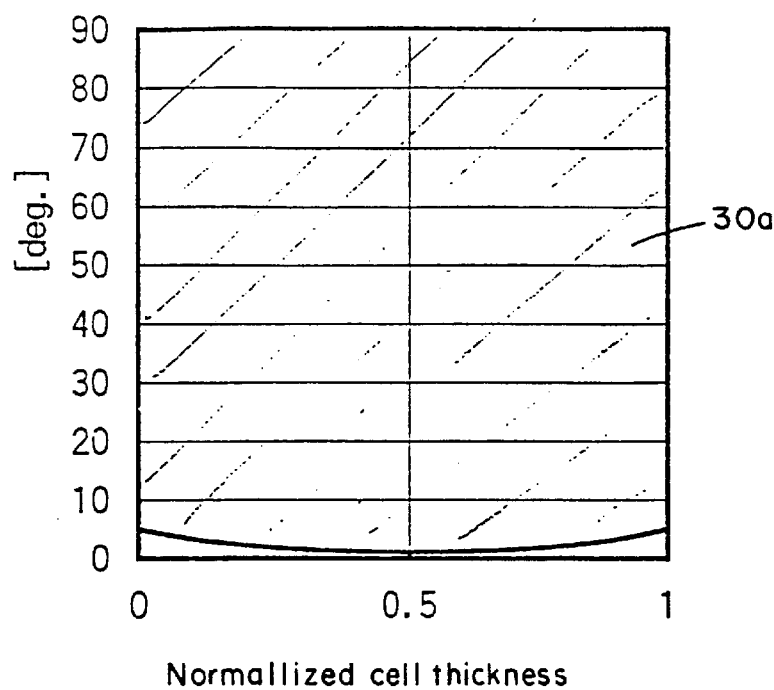
FIGS. 16A and 16B show graphs respectively showing the distribution of a tilt angle with no voltage applied.
Figure 16B:
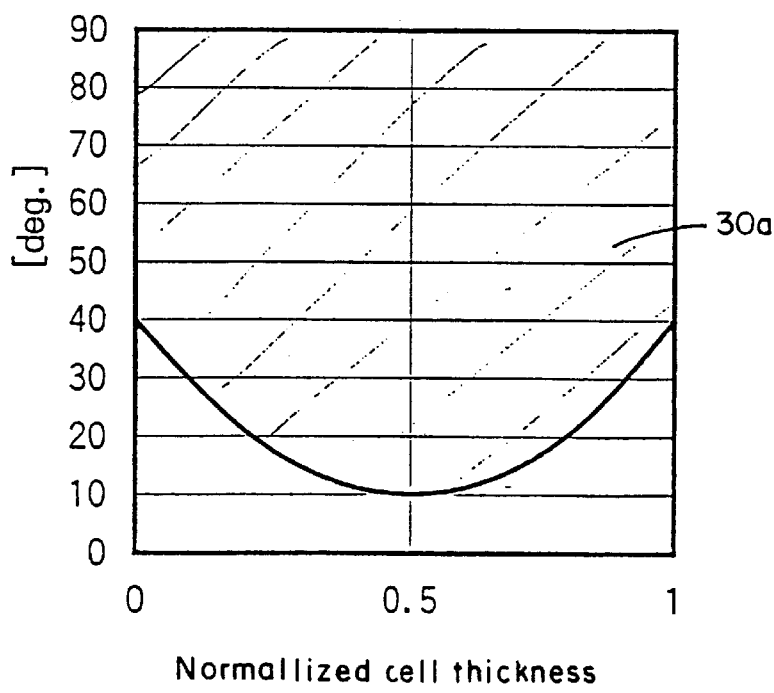

The effect of a pretilt angle on optical characteristics is studied. In a reflection type GH liquid crystal display device in which the orientation of liquid crystal molecules is twisted by 240°, as a pretilt angle becomes larger, a pleochroic dye on the surface of a substrate absorbs less light under the application of a voltage. Therefore, a bright display can be obtained. FIG. 15A is a graph showing dependency of a light reflectance on a pretilt angle under the application of a voltage. As is understood from this figure, when a pretilt angle becomes larger, a brighter display can be obtained under the application of a voltage. Similarly, FIG. 15B is a graph showing dependency of a light reflectance on a pretilt angle with no voltage applied. When a pretilt angle becomes larger with no voltage applied, liquid crystal molecules on the surface of a substrate substantially rise. Therefore, light is not sufficiently absorbed, making it difficult to obtain a sufficient black display. This is schematically shown in FIGS. 16A and 16B. FIGS. 16A and 16B show distribution of an angle with respect to the surface of a substrate in the cell thickness direction. The vertical axis in each graph represents an angle (hereinafter, referred to as a tilt angle) of liquid crystal molecules with respect to surfaces of substrates. The horizontal axis in each graph represents a position between the substrates. In the graphs, the distance between the substrates is normalized to be 1. The tilt angles corresponding to 0 and 1 on the horizontal axis are equal to pretilt angles. As liquid crystal molecules rise more, the pleochroic dye absorbs less light. Therefore, the size of a shaded portion 30a in each figure is qualitatively considered to be proportional to the light absorption. FIGS. 16A and 16B show the case where a pretilt angle is 5° and the case where a pretilt angle is 40°, respectively. It is understood from these figures that the area of the shaded portion 30a is larger and a black display can be sufficiently conducted at a pretilt angle of 5°.

Figure 17:
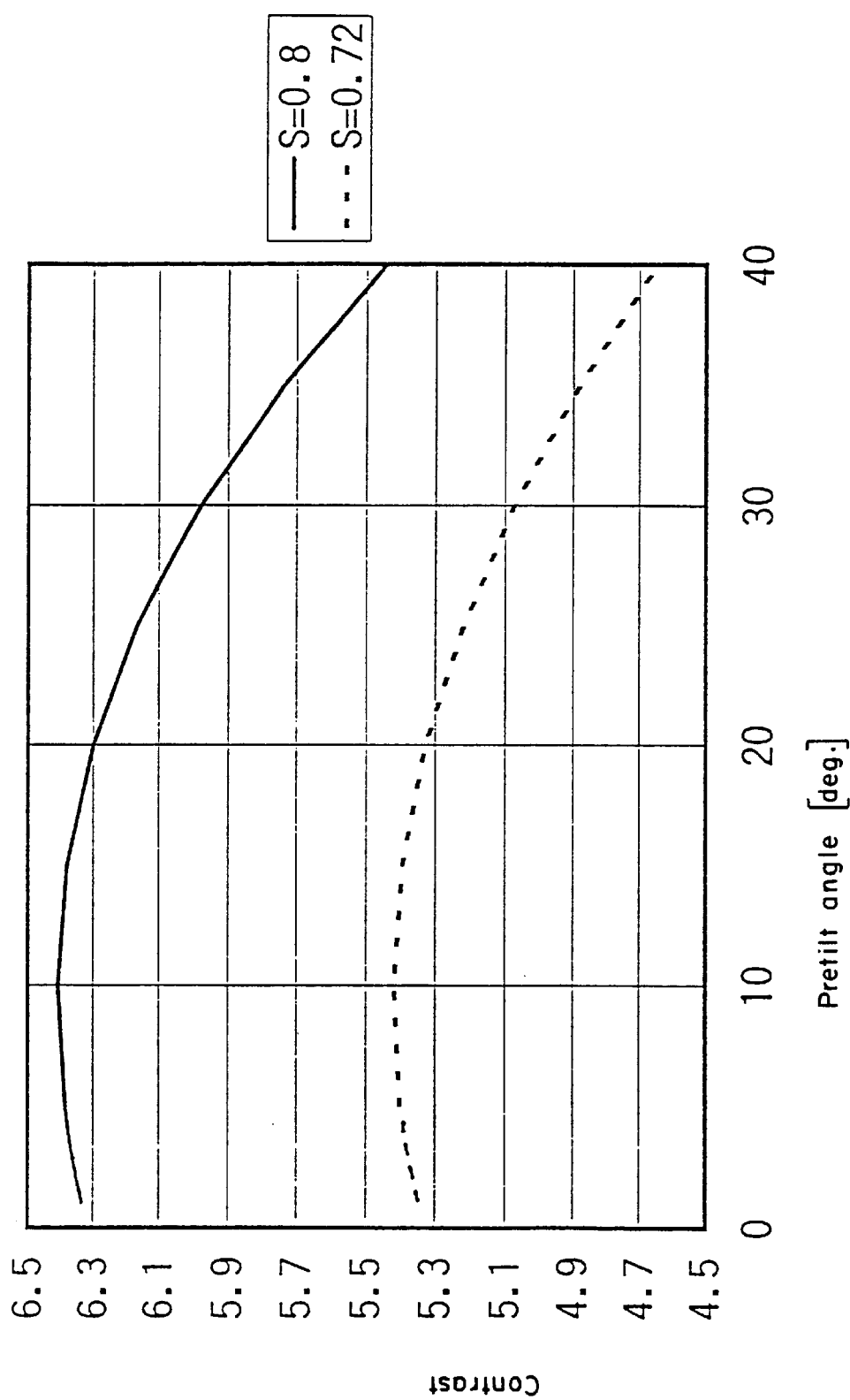
FIG. 17 is a graph showing dependency of a contrast on a pretilt angle.

FIG. 17 is a graph showing dependency of a pretilt angle on a contrast of a GH liquid crystal cell, using an order parameter S of GH liquid crystal as a parameter. It is understood from FIG. 17 that in the case of S=0.8, a contrast becomes maximum at a pretilt angle of 10°, and it decreases at a pretilt angle more than 10° and less than 10°. It is also understood that a contrast becomes maximum at a pretilt angle of around 10°, irrespective of the order parameter of GH liquid crystal. Based on the results shown in FIGS. 16A, 16B and 17, a pretilt angle is desirably in the range of around 1° to around 20°.

EXAMPLE 2

Figure 2:
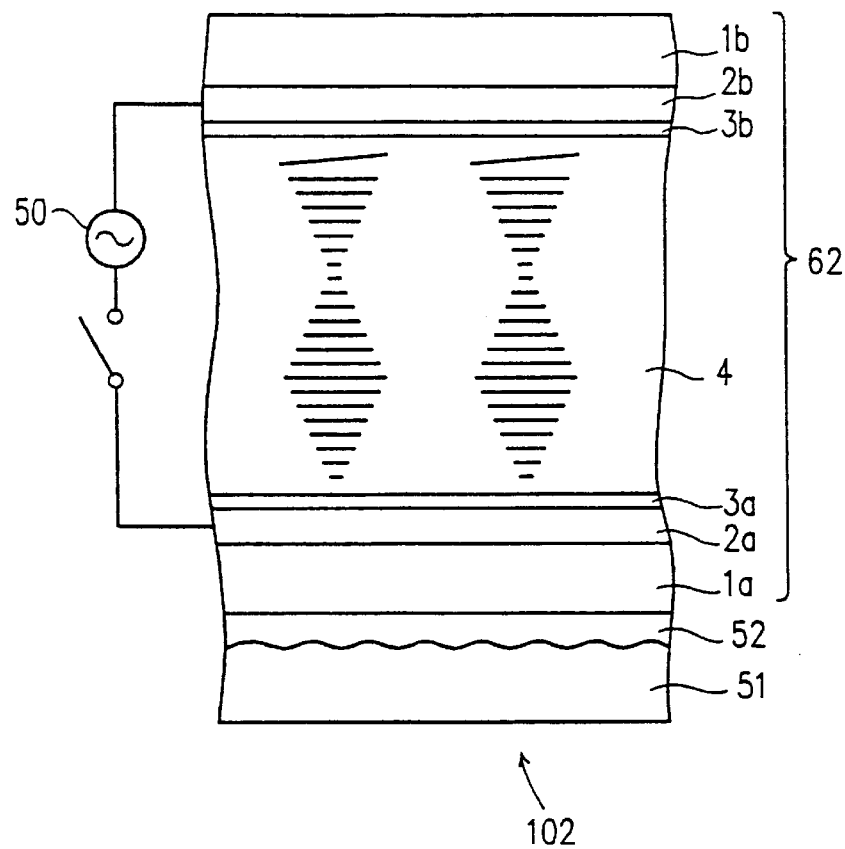
FIG. 2 is a cross-sectional view showing a structure of a liquid crystal display device in Example 2 according to the present invention.

FIG. 2 is a cross-sectional view showing a structure of another liquid crystal display device according to the present invention.

Referring to FIG. 2, a liquid crystal display device 102 has transparent substrates 1a and 1b placed at a predetermined distance. A transparent electrode 2a is provided on the transparent substrate 1a, and an alignment film 3a controlling the orientation of liquid crystal molecules is formed on the transparent electrode 2a. Similarly, a transparent electrode 2b is provided on a transparent substrate 1b, and an alignment film 3b controlling the orientation of liquid crystal molecules is formed on the transparent electrode 2b. A liquid crystal layer 4 including a mixture of a pleochroic dye and a chiral agent is provided between the alignment films 3a and 3b, whereby a GH liquid crystal cell 62 is formed. The liquid crystal layer 4 has positive anisotropy of dielectric constant. The liquid crystal layer 4 absorbs visible light through the pleochroic dye and has a spontaneous twisted structure due to the chiral agent.

As a light reflecting layer, a reflective plate 51 is attached to the surface of the substrate 1a opposite to the liquid crystal layer 4. The transparent electrodes 2a and 2b are connected to modulation control means 50 for changing the orientation of liquid crystal molecules. The modulation control means 50 supplies a display voltage across the transparent electrodes 2a and 2b to control the orientation of liquid crystal molecules, whereby the modulation of light intensity is regulated. The GH liquid crystal cell 62 containing helically aligned liquid crystal molecules is combined with the reflective plate 51 and the modulation control means 50 to constitute the liquid crystal display device 102 as an optical element capable of modulating the intensity of transmitted light.

The GH liquid crystal cell 62 of the liquid crystal display device 102 is produced by the procedure similar to that of Example 1. The reflective plate 51 is attached to the GH liquid crystal cell 62 via an adhesive layer 52, whereby the liquid crystal display device 102 is obtained. The reflective plate 51 is provided by forming a thin film made of metal with a high reflectance, such as aluminum and silver, on an uneven surface of the substrate. The surface of the substrate is made uneven by a well-known sand blast method and polishing method. A metal thin film is formed by vacuum deposition, sputtering, or the like.

Thus, a reflection-type liquid crystal display device with low power consumption is obtained, which is capable of conducting a bright display efficiently utilizing external light.

EXAMPLE 3

FIG. 3 is a cross-sectional view showing a structure of still another liquid crystal display device according to the present invention.

Referring to FIG. 3, a liquid crystal display device 103 has a support substrate 1a and a transparent substrate 1b placed at a predetermined distance. On one surface of the transparent substrate 1b, a transparent electrode 2b and an alignment film 3b for aligning liquid crystal molecules are provided in this order. On one surface of the support substrate 1a, a light reflective electrode 5a, and an alignment film 3c for aligning liquid crystal molecules are provided in this order. A liquid crystal layer 4 including a mixture of a pleochroic dye and a chiral agent is provided between the alignment films 3b and 3c, whereby a GH liquid crystal cell 63 is formed. The liquid crystal layer 4 includes a LC material with positive anisotropy of dielectric constant. The liquid crystal layer 4 absorbs visible light through the pleochroic dye and has a spontaneous twisted structure due to the chiral agent.

The transparent electrode 2b and the light reflective electrode 5a are connected to modulation control means 50 for changing the orientation of liquid crystal molecules. The modulation control means 50 supplies a display voltage across the transparent electrode 2b and the light reflective electrode 5a to control the orientation of liquid crystal molecules, whereby the modulation of light intensity is regulated. The GH liquid crystal cell 63 containing helically aligned liquid crystal molecules is combined with the modulation control means 50 to constitute the liquid crystal display device 103 as an optical element capable of modulating the intensity of transmitted light.

The liquid crystal display device 103 is produced by the procedure similar to that of Example 1 except for the light reflective electrode 5a.

Figure 5A:
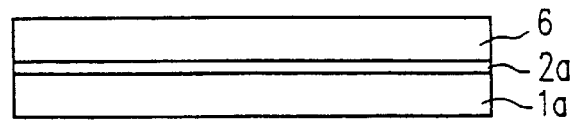
FIGS. 5A through 5F are cross-sectional views illustrating the steps of producing a light reflective electrode in Example 3 according to the present invention.
Figure 5B:
Figure 5C:
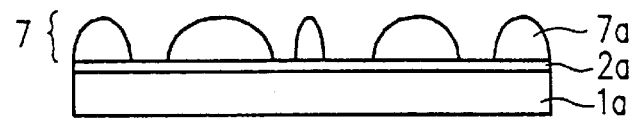
Figure 5D:
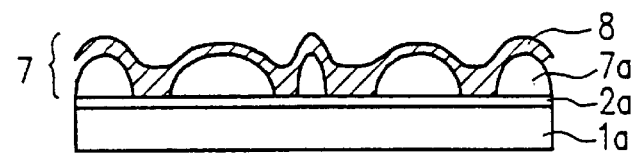
Figure 5E:
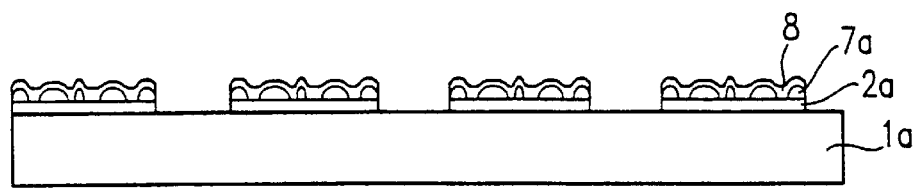
Figure 5F:
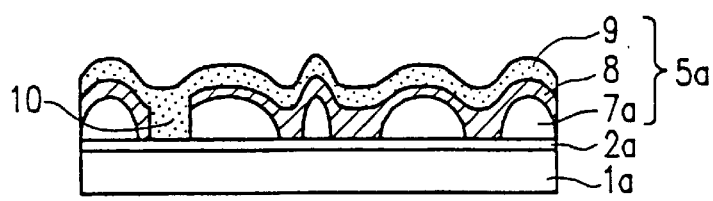
Figure 6:
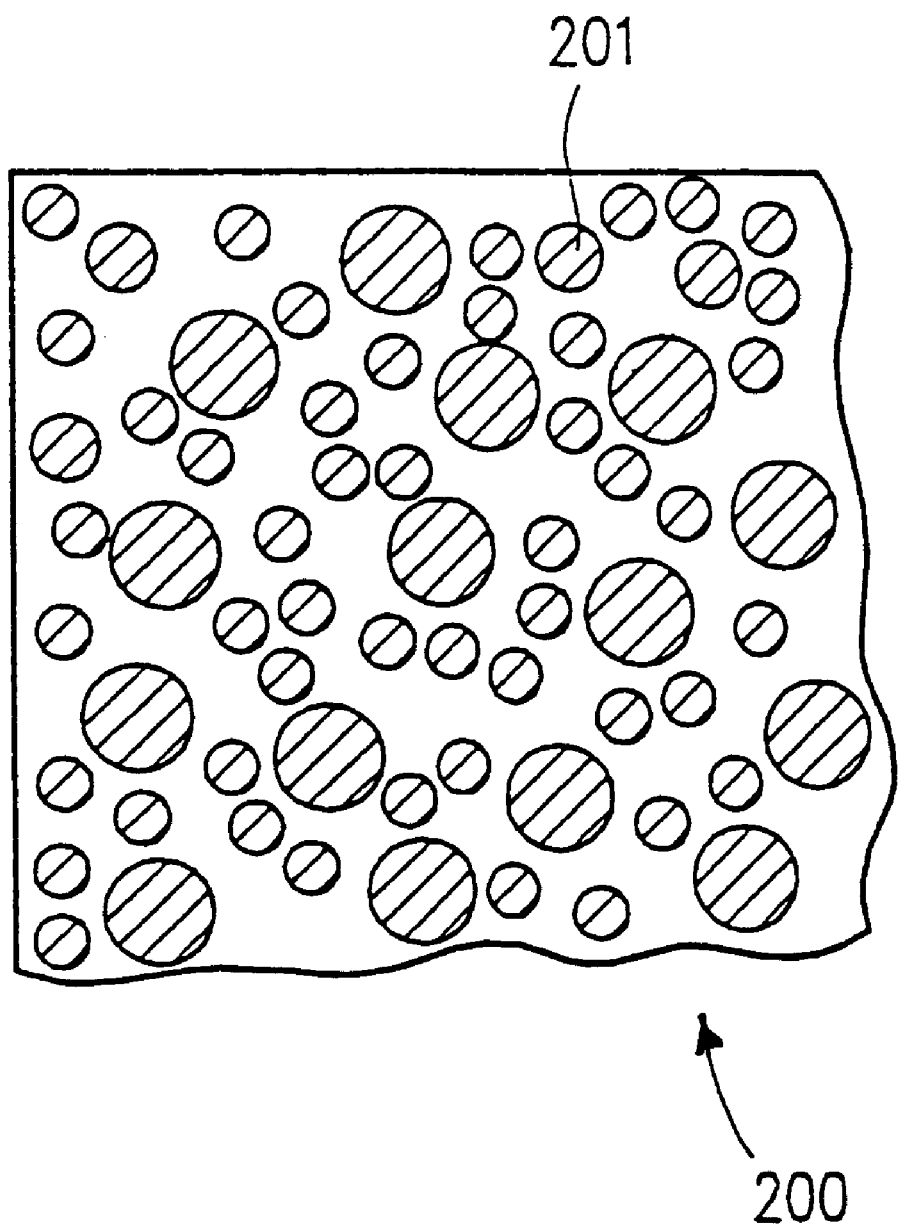
FIG. 6 is a light-blocking pattern used for photolithography in the course of production of the light reflective electrode in Example 3 according to the present invention.

A method for producing the light reflective electrode 5a will be described with reference to FIGS. 5A through 5F. As shown in FIG. 5A, an ITO film 2a is formed on one surface of the support substrate 1a by sputtering. The ITO film 2a is formed into a desired shape by photolithography. Thereafter, OFPR 800 (produced by Tokyo Ohka Kogyo Co., LTD.) is spin-coated onto the support substrate 1a to a desired thickness of 0.5 to 1.0 μm, whereby a photosensitive resin layer 6 also working as an insulating layer is formed. The photosensitive resin layer 6 is exposed to light using a mask 200 with a plurality of light-blocking portions 201 as shown in FIG. 6 and developed, so that a layer 7 having unevenness as shown in FIG. 5B is formed. Convex portions 7a thus formed are heat-treated at 200° C. so as to have a rounded shape as shown in FIG. 5C. Another photosensitive resin layer 8 which is the same as or different from the photosensitive resin layer 6 is spin-coated onto the uneven layer 7 so as to make the surface smoother as shown in FIG. 5D. Then, the photosensitive resin layer 8 is subjected to photolithography so as to have the same shape as that of pixel electrodes (FIG. 5E). Simultaneously with this, contact holes 10 reaching the underlying electrode (i.e., the ITO film 2a) are formed in part of the photosensitive resin layer 8 (FIG. 5F). Then, an aluminum thin film is formed as a metal reflective film 9 on the photosensitive resin layer 8 patterned into pixel electrodes, as shown in FIG. 5F. At this time, since the underlying electrode is electrically connected to the metal reflective film 9 through the contact holes 10, the metal reflective film 9 works as a reflective electrode.

The metal reflective film 9 thus formed is processed into a predetermined pixel pattern, whereby a pixel electrode with a light reflective layer is formed. Furthermore, the alignment film is formed over the entire surface of the metal reflective film 9 to complete a substrate with a light reflective layer.

The pixel electrode with a light reflective layer formed by the above procedure is collectively shown as the light reflective electrode 5a in FIG. 3.

In the present example, the metal reflective film 9 is connected to the ITO film 2a which is a signal electrode through the contact holes 10 formed in the photosensitive resin layer 8. Alternatively, the ITO film 2a can be omitted, using the metal reflective film 9 both as a reflective film and as a signal electrode. Alternatively, the portions of the photosensitive resin layer 6, which will be provided in places where the metal reflective film 9 is removed by patterning, may be left.

In the present example, aluminum is used for the metal reflective film 9. However, any metal can be used as long as it has uniform reflection characteristics and a high reflectance in a visible light region. For example, silver can be used in place of aluminum.

The structure of the present example includes a reflective layer in the liquid crystal cell, so that a high quality liquid crystal display device capable of conducting a bright display without any effect of parallax can be realized.

EXAMPLE 4

FIG. 4 is a cross-sectional view showing a structure of still another liquid crystal display device according to the present invention.

Referring to FIG. 4, a liquid crystal display device 104 has a support substrate 1a and a transparent substrate 1b placed at a predetermined distance. A transparent electrode 2b is provided on the transparent substrate 1b, and an alignment film 3b aligning liquid crystal molecules is formed on the transparent electrode 2b. A transparent electrode 2a and a plurality of thin film diodes 12 as active elements are provided on the support substrate 1a, and an alignment film 3a aligning liquid crystal molecules is formed on the transparent electrode 2a and the thin film diodes 12. A liquid crystal layer 4 including a mixture of a pleochroic dye and a chiral agent is provided between the alignment films 3a and 3b, whereby a GH liquid crystal cell 64 is formed. The liquid crystal layer 4 includes a LC material with positive anisotropy of dielectric constant. The liquid crystal layer 4 absorbs visible light through the pleochroic dye and has a spontaneous twisted structure due to the chiral agent. The liquid crystal cell 64 includes a plurality of display pixels arranged in a matrix, and one thin film diode 12 is provided for each display pixel.

The transparent electrode 2b and the thin film diodes 12 are connected to modulation control means 50 for changing the orientation of liquid crystal molecules. The modulation control means 50 is connected to the thin film diodes 12 respectively provided in the pixel electrodes (not shown). The modulation control means 50 supplies a display voltage across the transparent electrodes 2a and 2b via the thin film diodes 12 to control the orientation of liquid crystal molecules, whereby the modulation of light intensity is regulated. The GH liquid crystal cell 64 containing helically aligned liquid crystal molecules is combined with the modulation control means 50 to constitute the liquid crystal display device 104 as an optical element capable of modulating the intensity of transmitted light.

The liquid crystal display device 104 is produced by the procedure similar to that of Example 1 except for the thin film diodes.

Hereinafter, a method for producing a thin film diode as an active element will be described with reference to FIGS. 7A through 7E.

Figure 7A:
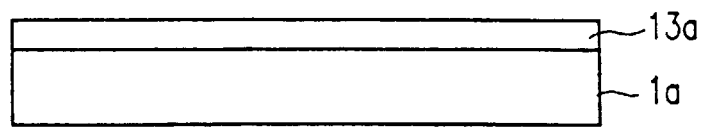
FIGS. 7A through 7E are cross-sectional views illustrating the steps of producing a thin film diode in Example 4 according to the present invention.
Figure 7B:
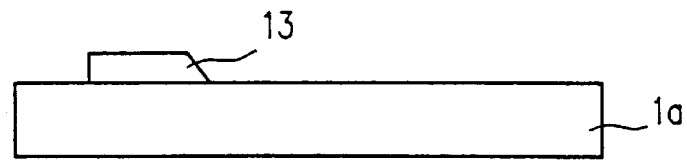
Figure 7C:
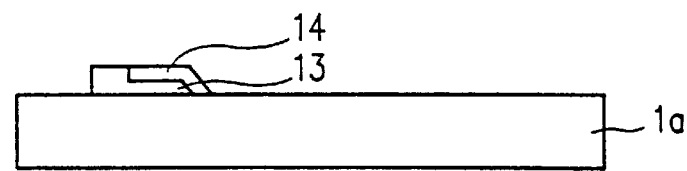
Figure 7D:
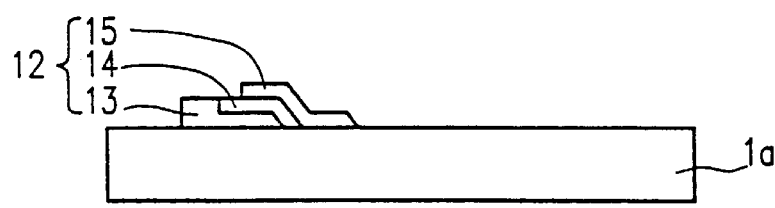
Figure 7E:
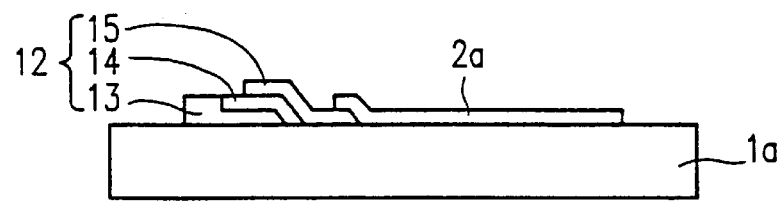

As shown in FIG. 7A, a tantalum (Ta) thin film 13a is formed on one surface of the substrate 1a to a thickness of about 3000 Å by sputtering. Then, as shown in FIG. 7B, the Ta thin film 13a is subjected to photolithography so as to have a desired shape, whereby a Ta wiring 13 is formed. Thereafter, as shown in FIG. 7C, the surface of the Ta wiring 13 is subjected to anodic oxidation to form a $Ta_2O_5$ insulating layer 14 with a thickness of about 600 Å. Furthermore, as shown in FIG. 7D, a titanium (Ti) film is formed on the $Ta_2O_5$ insulating layer 14 by sputtering, and the Ti film is subjected to photolithography so as to have a predetermined shape, whereby a Ti electrode 15 is formed. Thus, the thin film diode 12 as an active element is formed on the support substrate 1a. Furthermore, as shown in FIG. 7E, an ITO film is formed and patterned over the Ti electrode 15, the $Ta_2O_5$ insulating layer 14, and the Ta wiring 13, whereby a pixel transparent electrode 2a connected to the Ti electrode 15 is formed. In this manner, the thin film diode 12 as an active element is formed.

The liquid crystal display device of the present example enables a large capacity display to be conducted because of the active elements provided in the liquid crystal cell. This allows a liquid crystal display device for an information display terminal with high brightness and low power consumption to be realized.

In the present example, thin film diodes are used as the active elements. However, the active elements are not limited thereto. Thin film transistors may be used in place of the thin film diodes.

The liquid crystal display device of the present example can also be used as a reflection-type liquid crystal display device having a reflective layer in a liquid crystal cell, by forming a light reflective layer in accordance with the procedure similar to that of Example 3.

Figure 8A:
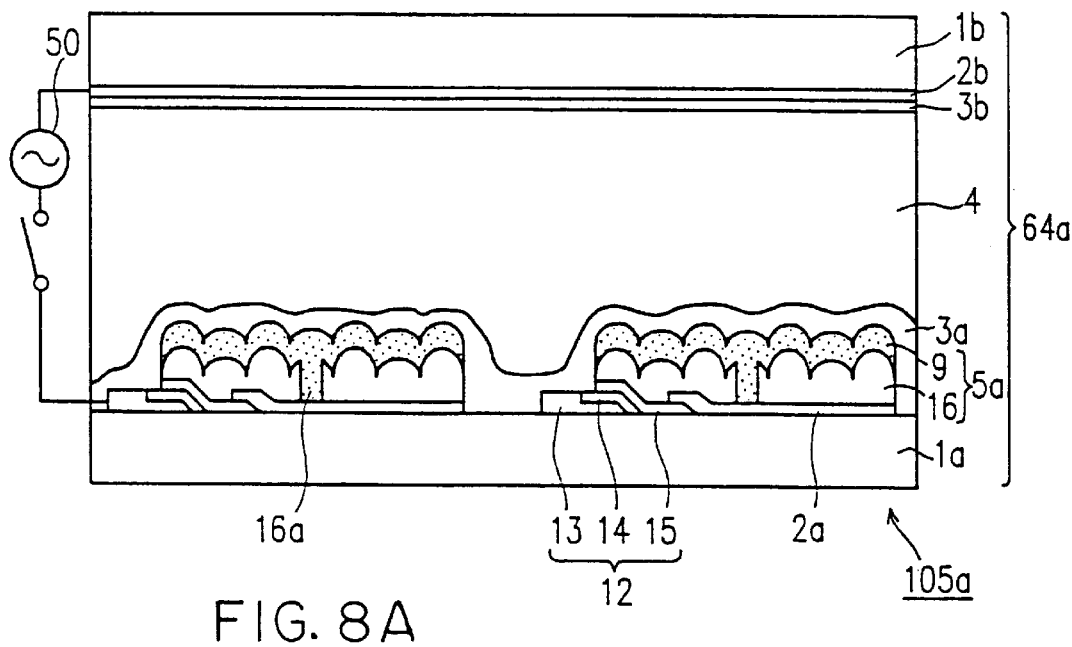
FIGS. 8A and 8B are cross-sectional views showing structures of other liquid crystal display devices in Example 4 according to the present invention.
Figure 8B:
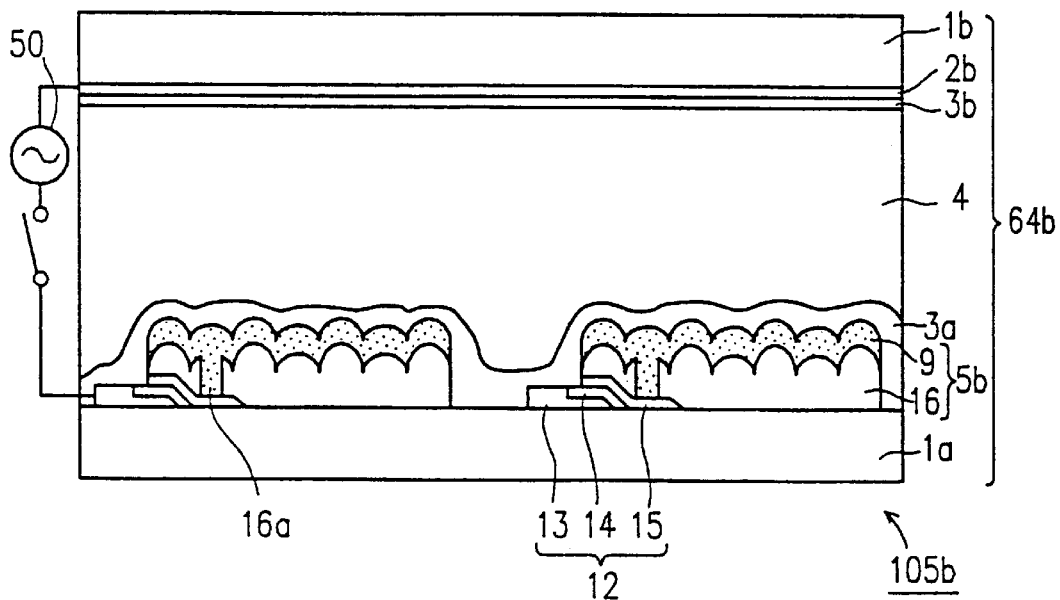

FIGS. 8A and 8B show cross-sectional views of reflection-type liquid crystal display devices 105a and 105b produced in the above-mentioned manner. As shown in these figures, the uneven layer 7 and the photosensitive resin layer 8 are collectively represented as a layer 16 provided with contact holes 16a. The reflection-type liquid crystal display device 105a shown in FIG. 8A has the thin film diode 12 connected to the light reflective pixel electrode 5a. Because of this structure, the reflection-type liquid crystal display device 105a has no parallax and is excellent in display quality.

In the reflection-type liquid crystal display device 105b shown in FIG. 8B, the light reflective film 9 also works as the electrode 2a in the reflection-type liquid crystal display device 105a. Because of this structure, the production steps can be simplified in addition to the above-mentioned features.

In the present example, the reflection-type liquid crystal display device has been described. However, the present invention can also be used as a transmission-type liquid crystal display device.

According to the present invention, the twist angle of the chiral nematic liquid crystal layer having positive anisotropy of dielectric constant is set in the range of 0° to 50°, in the range of 140° to 250°, and in the range obtained by adding an integral multiple of $\pi$ radian to the values in these ranges. Thus, a liquid crystal display device capable of efficiently utilizing light can be provided under the same applied voltage.

Furthermore, by providing a light reflective plate reflecting light transmitted through the liquid crystal layer outside of the liquid crystal cell, a liquid crystal display device is capable of efficiently utilizing light from an external light source to conduct a bright display with lower power consumption.

EXAMPLE 5

Figure 18:
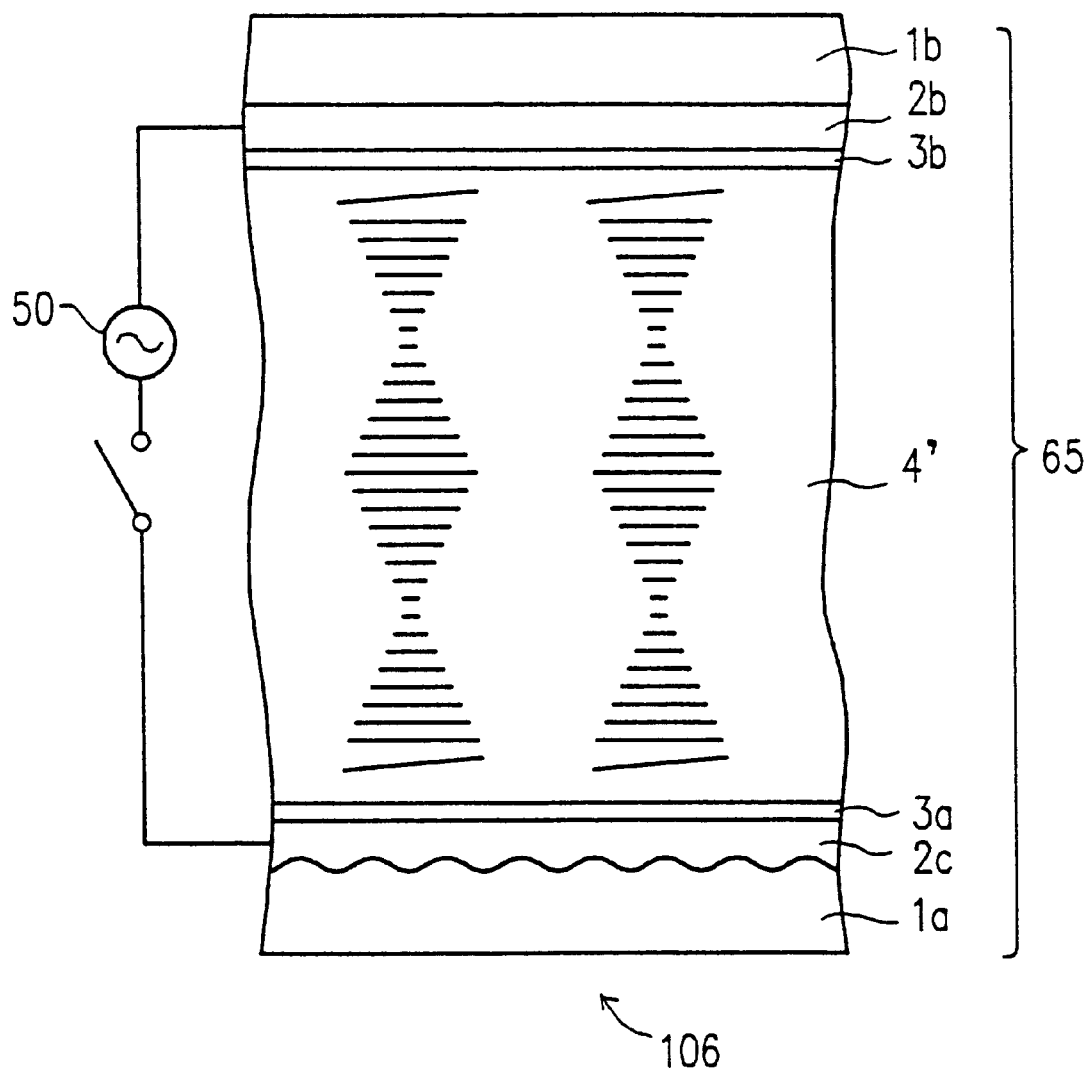
FIG. 18 a cross-sectional view showing a structure of a liquid crystal display device in Example 5 according to the present invention.

FIG. 18 is a cross-sectional view showing a structure of a liquid crystal display device 106 in the present example according to the present invention. As shown in this figure, the liquid crystal display device 106 includes a support substrate 1a and a transparent substrate 1b placed at a certain distance. The support substrate 1a is provided with a reflective plate 2c also working as a display electrode, and an alignment layer 3a is provided on the reflective plate 2c. The surface of the support substrate 1a has unevenness, and a reflective plate 2c also working as a display electrode is provided on the surface of the support substrate 1a. Furthermore, an alignment film 3a is provided on the reflective plate 2c so as to be in contact with liquid crystal molecules. Similarly, the transparent substrate 1b is provided with a transparent electrode 2b, and an alignment film 3b is provided on the transparent electrode 2b. A liquid crystal layer 4' made of a mixture containing a pleochroic dye and a chiral agent is provided between the alignment films 3a and 3b. The liquid crystal layer 4' absorbs light through the pleochroic dye and has a spontaneous twisted structure due to the chiral agent. The reflective plate 2c and the transparent electrode 2b are connected to modulation control means 50 for changing the orientation of liquid crystal molecules. The modulation control means 50 supplies a display voltage across the reflective plate 2c and the transparent electrode 2b to control the orientation of liquid crystal molecules, whereby the modulation of light intensity is regulated. The GH liquid crystal cell containing liquid crystal whose orientation is twisted is combined with the modulation control means 50 to complete the liquid crystal display device 106 as an optical element capable of modulating the intensity of transmitted light. In the present example, the allowable range of the ratio d/p was previously measured by using a wedge cell. The orientation of liquid crystal was rotated by about 240° between the substrates at the ratio d/p of about 0.42 or more under the condition of a pretilt angle of 1.5°. When the ratio d/p is about 0.54 or more, stripe domains are formed. Based on this result, the allowable ratio d/p is in the range of about 0.42 to about 0.54. In the case where a spontaneous pitch is about 9 μm, the allowable range of the cell thickness d is in the range of about 3.78 μm to about 4.86 μm, and the margin is ±0.54 μm from the central value of this range. In the present example, the substrate has an uneven surface because of the reflective plate placed thereon. The difference in step of the unevenness is ±0.5 μm from the central value. Thus, the allowable range of variation in cell thickness is only 0.04 μm, based on the above-mentioned experimental result using the wedge cell. In this case, the controllability of the cell thickness should be ±0.1% or less when the cell thickness is about 4.5 μm. This makes the actual production process very difficult to realize.

In contrast, in the case where a pretilt angle is 5°, the orientation of liquid crystal molecules is twisted by 240° at a ratio dip of 0.42 or more based on the experimental result using the wedge cell. When the ratio dip is 0.67 or more, stripe domains are formed. As a result, the allowable ratio d/p is in the range of 0.42 to 0.67. In the case where a spontaneous pitch is 9 μm, the allowable range of the cell thickness d is in the range of 3.78 μm to 6.03 μm, and the margin is ±1.12 μm from the central value of this range. In the present example, the substrate has an uneven surface because of the reflective plate 2c placed thereon. The difference in step of the unevenness is ±0.5 μm from the central value. Thus, the allowable range of variation in cell thickness is ±0.62 μm, based on the above-mentioned experimental result using the wedge cell. In this case, a cell can be produced with the controllability of ±13% or less of a cell thickness when the cell thickness is 4.5 μm. This case is applicable to an actual cell production process.

Hereinafter, a method for producing the liquid crystal display device with the above-mentioned structure will be described.

A glass substrate (7059, Corning Glass; manufactured by Waaks) having a thickness of 1.1 mm is used as the transparent substrates 1a and 1b. Aluminum is provided on the glass substrate 1a by sputtering to form the reflective plate 2c. The glass substrate 1a has minute unevenness. This unevenness was formed by a well-known sand blast method and polishing method. In this manner the reflective plate 2c with a light scattering property is formed. An ITO film is provided on the transparent substrate 1b by sputtering to form the transparent electrode 2b. Polyimide (SE-150; produced by Nissan Chemical Industries, Ltd.) is uniformly provided on the reflective plate 2c and the transparent electrode 2b by spin coating to obtain the alignment films 3a and 3b, respectively. The alignment films 3a and 3b are subjected to rubbing after baking. The rubbing direction is set in such a manner that the orientation of liquid crystal molecules is twisted by about 240° between the substrates 1a and 1b.

Thereafter, glass fiber spacers (not shown) with a diameter of 4.5 μm are sprinkled over the alignment film of one of the transparent substrates so as to uniformly keep the thickness of the liquid crystal layer 4'. As a liquid crystal sealing layer (not shown), an adhesive sealant mixed with glass fiber spacers having a diameter of 4.8 μm is printed onto the periphery of each substrate by screen printing. Then, the substrates 1a and 1b are attached to each other so that the alignment films 3a and 3b face each other. A liquid crystal material is injected between the substrates 1a and 1b by vacuum injection, whereby a GH liquid crystal cell is produced.

In the present example, the thickness of the liquid crystal layer is set to be 4.5 μm. However, the thickness is not limited thereto. The thickness of the liquid crystal layer is set in such a manner that the liquid crystal layer absorbs sufficient visible light and a practical response to an applied voltage is obtained. Thus, the thickness is generally in the range of 2 to 15 μm.

A GH liquid crystal material is prepared as follows. Fluorine-type mixed liquid crystal is used as host liquid crystal. Several percent by weight of several kinds of azo-type or anthraquinone-type black pleochroic dyes are mixed with the host liquid crystal, whereby a hue is adjusted so as to obtain a monochromic display. Furthermore, several percent by weight of an optically active material (S-811; produced by Merck & Co., Inc.) is mixed with the mixture containing the host liquid crystal and the dyes for the purpose of allowing the liquid crystal to be spontaneously twisted, in such a manner that the ratio between a pitch p and a cell thickness d (i.e., d/p) becomes almost 0.5. The reflection-type liquid crystal display device thus produced is capable of conducting a gray-scale display with a contrast of 6.

In the present example, a support substrate 1a without active elements is used. However, it is appreciated that a large capacity display can be conducted by the combination of active elements such as a TFT and an MIM. Furthermore, in the present example, only a monochromic display is conducted. However, a color display can also be conducted by the combination of a well-known micro-color filter.

As described above, according to the present invention, a reflection-type liquid crystal display device capable of conducting a bright display with a satisfactory contrast can be realized. Furthermore, by specifying the range of a pretilt angle and a twist angle to obtain optimum brightness and contrast in a reflection-type GH display device, the degree of freedom of design increases and a liquid crystal display can be more easily designed.

The range of the twist angle of liquid crystal molecules described in Examples 1 to 5 is equal to that of the optimum twist angle in the reflection-type liquid crystal display device.

It is not always possible to obtain an optimum numeric value for the reflection-type liquid crystal display device merely by halving the numeric values such as the twist angle and the birefringence optimized so as to provide a preferable contrast in the transmission-type liquid crystal display device. This is because, in the reflection-type liquid crystal display device, the plane of symmetry of twist orientation of liquid crystal molecules is present on the reflective plate. Because of the presence of the plane of symmetry of the twist orientation, the optical rotations of the liquid crystal layer with respect to incident light and reflected light are different. The plane of symmetry of the twist orientation is not present in the transmission-type liquid crystal display device, so that the effect of the liquid crystal layer on an optical path is different between the reflection-type liquid crystal device and the transmission-type liquid crystal display device. The range of the twist angle which provides a preferable contrast as described in the above Examples is determined considering these effects.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display device comprising a liquid crystal cell including:

a pair of substrates at least one of which has light transparency;

a chiral nematic liquid crystal layer having positive anisotropy of dielectric constant, disposed between the pair of substrates;

voltage applying means for applying a voltage to the liquid crystal layer; and light reflecting means for reflecting light transmitted through the liquid crystal layer, wherein the liquid crystal cell includes a plurality of display pixels arranged in a matrix, and the voltage applying means includes a plurality of active elements for applying a voltage to the liquid crystal layer with respect to each of the display pixels, wherein the liquid crystal layer contains a pleochroic dye, and liquid crystal molecules in the liquid crystal layer are twisted with respect to a helical axis perpendicular to surfaces of the pair of substrates, wherein a twist angle of the liquid crystal molecules from one of the pair of substrates to the other of the pair of substrates is in a range selected from the group consisting of a range from about 0° to about 50°, a range from about 140° to about 250°, and a range of twist angles obtained by adding an integral multiple of In radians to the twist angles in the range from about 0° to about 50° and in the range from about 140° to about 250°, and wherein substantially all bulk liquid crystal molecules within the liquid crystal layer rise under the applied voltage, causing the pleochroic dye to rise, so that only pleochroic dye at an interface of the pair of substrates contributes to the light absorption, thereby achieving the brightest display in the liquid crystal device.

2. A liquid crystal display device according to claim 1, wherein the light reflecting means is a light reflective plate provided outside of the liquid crystal cell.

3. A liquid crystal display device according to claim 1, wherein the voltage applying means includes a transparent electrode provided between the substrate having light transparency and the liquid crystal layer and a reflective electrode provided between the other substrate and the liquid crystal layer.

4. A liquid crystal display device according to claim 1, wherein the liquid crystal cell includes a plurality of display pixels arranged in a matrix, and the voltage applying means includes a plurality of active elements for applying a voltage to the liquid crystal layer with respect to each of the display pixels.

5. A liquid crystal display device according to claim 1, wherein a pretilt angle of the liquid crystal molecules in the chiral nematic liquid crystal layer is in the range of about 1° to about 20°.

6. A liquid crystal display device according to claim 1, wherein the twist angle of the liquid crystal molecules in the chiral nematic liquid crystal layer is about 240°.

7. A liquid crystal display device according to claim 6, wherein a ratio d/p is in the range of about 0.42 to about 0.91, where d is a distance between the pair of substrates, and p is a spontaneous pitch of a liquid crystal material contained in the chiral nematic liquid crystal layer.

8. A liquid crystal display device according to claim 1, wherein a birefringence Δn of the liquid crystal material contained in the chiral nematic liquid crystal layer is greater than 0 and less than or equal to about 0.1.

9. A liquid crystal display device according to claim 1, wherein an elastic constant $k_{11}$ of a splay of a liquid crystal material contained in the chiral nematic liquid crystal layer is greater than 0 and less than or equal to about 10 pN.

10. A liquid crystal display device according to claim 1, wherein an elastic constant ratio $k_{33}/k_{11}$ between a bend and a splay of the liquid crystal material contained in the chiral nematic liquid crystal layer is greater than 0 and less than or equal to about 1.27.

11. A liquid crystal display device according to claim 1, wherein the twist angle is in a range selected from the group consisting of a range from about 0° to about 50°, and a range from about 140° to about 250°.

12. A liquid crystal display device according to claim 1, wherein the twist angle is in the range of about 0° to about 50°.

13. A liquid crystal display device according to claim 1, wherein the direction of the liquid crystal molecules at the interface of the substrates is parallel to each other.

14. A liquid crystal display device comprising a liquid crystal cell including:

a pair of substrates at least one of which has light transparency;

a chiral nematic liquid crystal layer having positive anisotropy of dielectric constant, disposed between the pair of substrates; and voltage applying means for applying a voltage to the liquid crystal layer, wherein the liquid crystal cell includes a plurality of display pixels arranged in a matrix, and the voltage applying means includes a plurality of active elements for applying a voltage to the liquid crystal layer with respect to each of the display pixels, wherein the liquid crystal layer contains a pleochroic dye, and liquid crystal molecules in the liquid crystal layer are twisted with respect to a helical axis perpendicular to surfaces of the pair of substrates, wherein a twist angle of the liquid crystal molecules from one of the pair of substrates to the other of the pair of substrates is in a range selected from the group consisting of a range from about 0° to about 50°, a range from about 140° to about 250°, and a range of twist angles obtained by adding an integral multiple of , radians to the twist angles in the range from about 0° to about 50° and in the range of about 140° to about 250°, wherein substantially all bulk liquid crystal molecules within the liquid crystal layer rise under the applied voltage, causing the pleochroic dye to rise, so that only pleochroic dye at an interface of the pair of substrates contributes to the light absorption, thereby achieving the brightest display in the liquid crystal device, and wherein the selected twist angle provides a light reflectance in the range of from about 50% to about 52%.

* * * * *